(12) United States Patent
Bookbinder et al.

(10) Patent No.: US 7,787,731 B2
(45) Date of Patent: Aug. 31, 2010

(54) BEND RESISTANT MULTIMODE OPTICAL FIBER

(75) Inventors: Dana Craig Bookbinder, Corning, NY (US); Ming-Jun Li, Horseheads, NY (US); Daniel Aloysius Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/004,174

(22) Filed: Dec. 20, 2007

(65) Prior Publication Data

US 2008/0166094 A1     Jul. 10, 2008

Related U.S. Application Data

(60) Provisional application No. 60/879,164, filed on Jan. 8, 2007.

(51) Int. Cl.
    *G02B 6/028*      (2006.01)
    *G02B 6/036*      (2006.01)

(52) U.S. Cl. ..................................... 385/124; 385/127

(58) Field of Classification Search ............. None
See application file for complete search history.

(56) References Cited

U.S. PATENT DOCUMENTS

| | | | | |
|---|---|---|---|---|
| 4,149,772 A | 4/1979 | Iyengar et al. | ............ | 350/96.33 |
| 4,176,911 A | 12/1979 | Marcatili et al. | ......... | 350/96.31 |
| 4,184,744 A | 1/1980 | Onoda et al. | ............ | 350/96.33 |
| 4,229,070 A | 10/1980 | Olshansky et al. | ........ | 350/96.31 |
| 4,281,893 A | 8/1981 | Yamada et al. | ........... | 350/96.31 |
| 4,339,174 A | 7/1982 | Levin | ...................... | 350/96.31 |
| 4,715,695 A | 12/1987 | Nishimura et al. | ....... | 350/96.31 |
| 4,877,304 A * | 10/1989 | Bhagavatula | ................ | 385/124 |
| 5,123,076 A | 6/1992 | Nishimoto et al. | .......... | 385/124 |
| 5,191,206 A | 3/1993 | Boiarski et al. | ........ | 250/227.14 |
| 5,802,236 A | 9/1998 | DiGiovanni et al. | ........ | 385/127 |
| 6,434,309 B1 * | 8/2002 | Abbott et al. | ............... | 385/123 |
| 6,614,974 B2 | 9/2003 | Elrefaie et al. | .............. | 385/125 |
| 6,636,675 B2 | 10/2003 | Soufiane | ..................... | 385/123 |
| 6,671,442 B2 | 12/2003 | Wang et al. | .................. | 385/125 |
| 6,687,445 B2 | 2/2004 | Carter et al. | ................. | 385/127 |
| 6,766,088 B2 | 7/2004 | Hasegawa et al. | ........... | 385/123 |
| 6,773,825 B2 | 8/2004 | Pickrell et al. | .............. | 428/566 |

(Continued)

FOREIGN PATENT DOCUMENTS

EP            1043609            10/1999

(Continued)

OTHER PUBLICATIONS

Baggett, Joanne C. et al, "Improving Bending Losses in Holey Fibers", Optical Fiber Communication Conference, 2005. Technical Digest. OFC/NFOEC, Mar. 6-11, 2005, vol. 3, 3 pp.

(Continued)

*Primary Examiner*—Mike Stahl
(74) *Attorney, Agent, or Firm*—Joseph M. Homa; Robert L. Carlson (57) ABSTRACT

Bend resistant multimode optical fibers are disclosed herein. Multimode optical fibers disclosed herein comprise a core region and a cladding region surrounding and directly adjacent to the core region, the cladding region comprising a depressed-index annular portion comprising a depressed relative refractive index.

23 Claims, 5 Drawing Sheets

U.S. PATENT DOCUMENTS

| | | | |
|---|---|---|---|
| 6,795,635 B1 | 9/2004 | Fajardo et al. | 385/140 |
| 6,904,215 B2 | 6/2005 | Christoff et al. | 385/124 |
| 7,039,284 B2 | 5/2006 | Nakahara | 385/125 |
| 7,043,128 B2 | 5/2006 | DiGiovanni et al. | 385/126 |
| 7,054,513 B2 | 5/2006 | Herz et al. | 385/12 |
| 7,072,552 B2 | 7/2006 | Manyam et al. | 385/125 |
| 7,142,758 B1 | 11/2006 | Herz et al. | 385/125 |
| 7,174,078 B2 | 2/2007 | Libori et al. | 385/125 |
| 2003/0128942 A1* | 7/2003 | DiGiovanni et al. | 385/123 |
| 2004/0069019 A1 | 4/2004 | Carter et al. | 65/414 |
| 2004/0228593 A1 | 11/2004 | Sun et al. | 385/127 |
| 2005/0094954 A1 | 5/2005 | Pickrell et al. | 385/123 |
| 2006/0034574 A1 | 2/2006 | Guan et al. | 385/125 |
| 2006/0045450 A1* | 3/2006 | Bickham | 385/127 |
| 2006/0263019 A1 | 11/2006 | Negishi et al. | 385/123 |
| 2007/0104437 A1 | 5/2007 | Bookbinder et al. | 385/125 |
| 2007/0116418 A1* | 5/2007 | Mishra | 385/123 |
| 2007/0196061 A1* | 8/2007 | Bickham et al. | 385/123 |
| 2008/0013905 A1 | 1/2008 | Bookbinder et al. | 385/124 |
| 2008/0124028 A1* | 5/2008 | Bickham et al. | 385/55 |
| 2009/0052851 A1 | 2/2009 | Donlagic | 385/124 |

FOREIGN PATENT DOCUMENTS

| | | |
|---|---|---|
| EP | 1083446 | 2/2000 |
| EP | 1617243 A1 | 3/2004 |
| EP | 1482606 A1 | 5/2004 |
| EP | 1564569 A1 | 9/2004 |
| JP | 2006-47719 | 2/2006 |
| JP | 2006-47719 A * | 2/2006 |
| WO | WO02/075393 | 9/2002 |
| WO | WO02/102730 | 12/2002 |
| WO | WO2006/010798 | 2/2006 |
| WO | WO2008/005233 | 1/2008 |

OTHER PUBLICATIONS

Bing, Y. et al, "Low-loss Holey Fiber", Hitachi Cable Review No. 24, Aug. 2005, pp. 1-5.

Ellis, Frederick P. K., "Fabrication of Random Hole Optical Fiber Preforms by Silica Sol-Gel Processing", Thesis to be submitted to Virginia Polytechnic Institute and State University, Feb. 19, 2004, 34 pp.

Guan, Ning et al, "Characteristics of field confined holey fiber analyzed by boundary element method", OFC 2002, Mar. 17-22, 2002, pp. 525-527.

Holton, Carvel et al, "Colloidal Quantum Dots Entrained in Microstructured Optical Fibers", Proceedings of SPIE, 2004, vol. 5335, pp. 258-265.

Kominsky, D. et al, "Generation of random-hole optical fiber", Optics Letters, Aug. 15, 2003, vol. 23, No. 16, pp. 1409-1411.

Matsuo, S. et al, "Bend-Insensitive and Low-Splice-Loss Optical fiber for Indoor Wiring in FTTH", Optical Fiber Communication Conference, 2004, Feb. 23-27, 2004, vol. 2, 3 pgs. with descriptive sheet attached.

Monro, Tanya M. et al, "Holey fibers with random cladding distributions", Optics Letters, Feb. 15, 2000, vol. 25, No. 4, pp. 206-208.

Monro, Tanya M. et al, "Holey fibers with randomly arranged air holes", Conference on Lasers and Electro-Optics, 2000. (CLEO 2000), pp. 607-608.

Pickrell, Gary et al, "Fiber Optic Chemical Sensing", Proceedings of SPIE, vol. 5998, Nov. 5, 2005, 15 pp.

Pickrell, Gary et al, "Microstructural Analysis of Random Hole Optical Fibers", IEEE Photonics Technology Letters, Feb. 2004, vol. 16, No. 2, pp. 491-493.

Pickrell, Gary R. et al, "New fabrication technique for random-hold optical fibers", Proceedings of SPIE—The International Society for Optical Engineering, v 5589, Fiber Optic Sensor Technology and Applications III, Oct. 26-28, 2004, pp. 257-265.

Pickrell, Gary R. et al, "Novel Techniques for the Fabrication of Holey Optical Fibers", The International Society for Optical Engineering, v 4578, Fiber Optic Sensor Technology and Applications 2001, Oct. 30-Nov. 1, 2001, pp. 271-282.

Pickrell, G. et al, "Random-hole optical fiber evanescent-wave gas sensing", Optics Letters, Jul. 1, 2004, vol. 29, No. 13, pp. 1476-1478.

Pickrell, Gary R. et al, "Random Hole Optical Fibers", Proceedings of SPIE, Industrial and Highway Sensors Technology, 2003, vol. 5272, pp. 207-215.

Richardson, D. J. et al, "Advances in Microstructured Fiber Technology", Proceedings of 2005 IEEE/LEOS Workshop on Fibres and Optical Passive Components, Jun. 22-24, 2005, pp. 1-9.

Shinohara, Hiromichi, "Broadband Access in Japan: Rapidly Growing FTTH Market", IEEE Communications Magazine, Sep. 2005, pp. 72-78.

Wu, Tzong-Lin et al, "A Novel Ultraflattened Dispersion Photonic Crystal Fiber", IEEE Photonics Technology Letters, Jan. 2005, vol. 17, No. 1, pp. 67-69.

Endo, Hideki, et al. "Modal Bandwidth Enhancement in a Plastic Optical Fiber by W-Refractive Index Profile", Journal of Lightwave Technology, vol. 23, No. 4, Apr. 2005, pp. 1754-1762.

Katsunari Okamoto and Takanori Okoshi, "Analysis of Wave Propagation in Optical Fibers Having Core with α-Power Refractive-Index Distribution and Uniform Cladding", IEE Transactions on Microwave Theory and Techniques, vol. MTT-24, No. 7, Jul. 1976, pp. 416-421.

D. Gloge, "Bending Loss in Multimode Fibers with Graded and Ungraded Core Index", Applied Optics, vol. 11, No. 11, Nov. 1972, pp. 2506-2513.

Katsunari Okamoto and Takanori Okoshi, "Computer-Aided Synthesis of the Optimum Refractive-Index Profile for a Multimode Fiber", IEE Transactions on Microwave Theory and Techniques, vol. MTT-25, No. 3, Mar. 1977, pp. 213-221.

Robert Olshansky, "Mode Coupling Effects in Graded-Index Optical Fibers", Applied Optics, vol. 14, No. 4, Apr. 1975, pp. 935-945.

Denis Donlagić, "Opportunities to Enhance Multimode Fiber Links by Application of Overfilled Launch", Journal of Lightwave Technology, vol. 23, No. 11, Nov. 2005, pp. 3526-3540.

Masahiro Geshiro, Masanori Matsuhara, and Nobuaki Kumagai, "Truncated Parabolic-Index Fiber with Minimum Mode Dispersion", IEE Transactions on Microwave Theory and Techniques, vol. MTT-26, No. 2, Feb. 1978, pp. 115-119.

* cited by examiner

BEND RESISTANT MULTIMODE OPTICAL FIBER

CROSS-REFERENCE TO RELATED APPLICATIONS

This application claims the benefit of, and priority to U.S. Provisional Patent Application No. 60/879,164 filed on Jan. 8, 2007, the content of which is relied upon and incorporated herein by reference in its entirety.

BACKGROUND OF THE INVENTION

1. Field of the Invention

The present invention relates generally to optical fibers, and more specifically to multimode optical fibers.

2. Technical Field

Corning Incorporated manufactures and sells InfiniCor® 62.5 µm optical fiber, which is multimode optical fiber having a core with a maximum relative refractive index of 2% and 62.5 µm core diameter, as well as InfiniCor® 50 µm optical fiber, which is multimode optical fiber having a core with a maximum relative refractive index of 1% and 50 µm core diameter.

SUMMARY OF THE INVENTION

Bend resistant multimode optical fibers are disclosed herein. Multimode optical fibers disclosed herein comprise a graded-index core region and a cladding region surrounding and directly adjacent to the core region, the cladding region comprising a depressed-index annular portion, or "depressed cladding ring" or "ring", comprising a depressed relative refractive index, relative to another portion of the cladding. Preferably, the refractive index profile of the core has a parabolic shape. The depressed-index annular portion comprises glass comprising a plurality of holes, or fluorine-doped glass, or fluorine-doped glass comprising a plurality of holes.

In some embodiments that comprise a cladding with holes, the holes can be non-periodically disposed in the depressed-index annular portion. By "non-periodically disposed" or "non-periodic distribution", we mean that when one takes a cross section (such as a cross section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross sections will have different hole patterns, wherein the distributions of holes and sizes of holes do not match. That is, the voids or holes are non-periodic, i.e., they are not periodically disposed within the fiber structure. These holes are stretched (elongated) along the length (i.e. parallel to the longitudinal axis) of the optical fiber, but do not extend the entire length of the entire fiber for typical lengths of transmission fiber.

In some embodiments that cladding comprises periodically disposed holes. The multimode optical fiber disclosed herein exhibits very low bend induced attenuation, in particular very low macrobending. In some embodiments, high bandwidth is provided by low maximum relative refractive index in the core, and low bend losses are also provided.

For example, using the designs disclosed herein, fibers can been made which provide (a) a bandwidth of greater than 750 MHz-km, more preferably greater than 1.0 GHz-km, and even more preferably greater than 2.0 GHz-km, and most preferably greater than 3.0 GHz-km at a wavelength of 850 nm. These high bandwidths can be achieved while still maintaining a 1 turn 10 mm diameter mandrel wrap attenuation increase at a wavelength of 1550 nm, of less than 0.5 dB, more preferably less than 0.3 dB, and most preferably less than 0.2 dB. Similarly, these high bandwidths which exhibit such impressive bend performance at 1550 nm can also maintaining a 1 turn 10 mm diameter mandrel wrap attenuation increase at a wavelength of 850 nm of less than 1.5 dB, more preferably less than 1.0 dB, and most preferably less than 0.62 dB. Such fibers can also exhibit a 1 turn 10 mm diameter mandrel wrap attenuation increase at a wavelength of 1550 nm, in dB, of less than or equal to the product of two times $(1/\Delta 1 MAX)^2$.

In some embodiments, the core radius is large (e.g. greater than 20 µm), the core refractive index is low (e.g. less than 1.0%), and the bend losses are low. Preferably, the multimode optical fiber disclosed herein exhibits a spectral attenuation of less than 3 dB/km at 850 nm. We have also found that spinning the multimode fiber further improves the bandwidth for optical fiber having a cladding having holes. By spinning, we mean applying or imparting a spin to the fiber wherein the spin is imparted while the fiber is being drawn from an optical fiber preform, i.e. while the fiber is still at least somewhat heated and is capable of undergoing non-elastic rotational displacement and is capable of substantially retaining the rotational displacement after the fiber has fully cooled.

The numerical aperture (NA) of the optical fiber is preferably greater than the NA of the optical source directing signals into the fiber; for example, the NA of the optical fiber is preferably greater than the NA of a VCSEL source. The bandwidth of the multimode optical fiber varies inversely with the square of $\Delta 1_{MAX}$. For example, a multimode optical fiber with $\Delta 1_{MAX}$ of 0.5% can yield a bandwidth 16 times greater than an otherwise identical multimode optical fiber except having a core with $\Delta 1_{MAX}$ of 2.0%.

In some embodiments, the core extends radially outwardly from the centerline to a radius R1, wherein $12.5 \leq R1 \leq 40$ microns. In some embodiments, $25 \leq R1 \leq 32.5$ microns, and in some of these embodiments, R1 is greater than or equal to about 25 microns and less than or equal to about 31.25 microns.

In some embodiments, the core has a maximum relative refractive index, less than or equal to 1.0%. In other embodiments, the core has a maximum relative refractive index, less than or equal to 0.5%.

In some embodiments, the optical fiber exhibits a 1 turn 10 mm diameter mandrel attenuation increase of no more than 1.0 dB, preferably no more than 0.5 dB, more preferably no more than 0.25 dB, even more preferably no more than 0.1 dB, and still more preferably no more than 0.05 dB, at all wavelengths between 800 and 1400 nm.

In a first aspect, multimode optical fiber is disclosed herein comprising a graded-index glass core, disposed about a longitudinal centerline, and a glass cladding surrounding the core. The cladding comprises an inner annular portion, a depressed-index annular portion, and an outer annular portion. The inner annular portion directly abuts the core, and the depressed-index annular portion directly abuts the inner annular region, and the inner annular portion has a relative refractive index profile having a maximum absolute magnitude, |Δ|, less than 0.05%. In some embodiments, the inner annular portion has a maximum relative refractive index profile, $\Delta 2_{MAX}$, less than 0.05%.

In a second aspect, multimode optical fiber is disclosed herein comprising a graded-index glass core, disposed about a longitudinal centerline, and a glass cladding surrounding the core. The cladding comprises a depressed-index annular portion surrounding and in contact with the core, and an outer annular portion surrounding and in contact with the depressed-index annular portion.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_{REF}^2)/2n_i^2$, where $n_i$ is the maximum refractive index in region i, unless otherwise specified. The relative refractive index percent is measured at 850 nm unless otherwise specified. In the first aspect, the reference index $n_{REF}$ is the refractive index at the core/clad interface. In the second aspect, $n_{REF}$ is the average refractive index of the outer annular portion of the cladding, which can be calculated, for example, by taking "N" index measurements ($n_{C1}, n_{C2}, \ldots n_{CN}$) in the outer annular portion of the cladding, and calculating the average refractive index by:

$$n_C = (1/N) \sum_{i=1}^{i=N} n_{Ci}.$$

As used herein, the relative refractive index is represented by $\Delta$ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

Macrobend performance was determined according to FOTP-62 (IEC-60793-1-47) by wrapping 1 turn around a either a 10 mm or 20 mm diameter mandrel (the "1×10 mm diameter macrobend loss" or the "1×20 mm diameter macrobend loss" and measuring the increase in attenuation due to the bending using an overfilled launch condition. For a fiber with low macrobend loss, the measurement is done by wrapping multiple turns on a mandrel to increase the accuracy. The macrobend loss is normalized to 1 turn/m by dividing the total loss by the number of wraps around the mandrel. Bandwidth was measured according to FOTP-204 with overfilled launch, except as noted. In some cases bandwidth can be measured using a restricted mode launch (RML). In these cases, the optical signal is only launched into the core of the test fiber. RML can be accomplished by using an optical source with a spot size of less than or equal to the diameter of the core of the test fiber. For example, 1) using a light restricting aperture, 2) a light emitting diode or laser source with a spot size less than or equal to the test core diameter, or 3) using light from a conventional multimode fiber (without a depressed cladding) with the core size less than or equal to the test fiber core size. In some cases, by using restricted mode launch conditions, the RML bandwidth (e.g., measured at 850 nm or 1300 nm) for multimode fibers containing a depressed cladding can be higher than the bandwidth for these fibers when measured using overfilled launch. For example, some fibers can have greater than 1 GHz-Km bandwidth at 850 nm using a restricted mode launch while they have a bandwidth of less than 750 MHz-Km when tested using an overfilled launch.

The term "α-profile" or "alpha profile" refers to a relative refractive index profile, expressed in terms of Δ(r) which is in units of "%", where r is radius, which follows the equation, $$\Delta(r) = \Delta(r_o)1 - [|r-r_o|/(r_1-r_o)]^\alpha),$$

where $r_o$ is the point at which Δ(r) is maximum, $r_1$ is the point at which Δ(r)% is zero, and r is in the range $r_i \leq r \leq r_f$, where Δ is defined above, $r_i$ is the initial point of the α-profile, $r_f$ is the final point of the α-profile, and α is an exponent which is a real number.

The depressed-index annular portion has a profile volume, $V_3$, defined herein as:

$$2 \int_{R_{INNER}}^{R_{OUTER}} \Delta_3(r) r \, dr$$

where $R_{INNER}$ is the depressed-index annular portion inner radius and $R_{OUTER}$ is the depressed-index annular portion outer radius as defined below.

Multimode optical fiber disclosed herein comprises a core and a cladding surrounding and directly adjacent the core. In some embodiments, the core comprises silica doped with germanium, i.e. germania doped silica. Dopants other than germanium, singly or in combination, may be employed within the core, and particularly at or near the centerline, of the optical fiber disclosed herein to obtain the desired refractive index and density. In some embodiments, the refractive index profile of the optical fiber disclosed herein is non-negative from the centerline to the outer radius of the core. In some embodiments, the optical fiber contains no index-decreasing dopants in the core.

The bandwidth of multimode fiber can be improved by reducing the core refractive index (delta) because the bandwidth is inversely proportional to $\Delta^2$. For example, the bandwidth will be improved by a factor of 4 if the core delta is reduced from 1% to 0.5%. However lowering of the core relative refractive index results in degradation in the optical fiber bending performance. The core diameter can be reduced even further in order to improve bending performance, but reducing the core diameter increases the risk of increased fiber-to-connector losses, or splice losses, because of the decreased tolerance of the fiber to misalignments with a connector or another fiber; i.e., a given offset due to a lateral misalignment becomes a larger percentage error for smaller core diameters.

The multimode fiber disclosed herein provides low bend losses, and in some embodiments can provide a lowered core refractive index without decreasing the core radius to the point of increasing the risk of connection losses.

In the multimode optical fiber disclosed herein, the core is a graded-index core, and preferably, the refractive index profile of the core has a parabolic (or substantially parabolic) shape; for example, in some embodiments, the refractive index profile of the core has an α-shape with an a value of about 2, preferably between 1.8 and 2.3, as measured at 850 nm; in some embodiments, the refractive index of the core may have a centerline dip, wherein the maximum refractive index of the core, and the maximum refractive index of the entire optical fiber, is located a small distance away from the centerline, but in other embodiments the refractive index of the core has no centerline dip, and the maximum refractive index of the core, and the maximum refractive index of the entire optical fiber, is located at the centerline. The parabolic shape extends to a radius R1 and preferably extends from the centerline of the fiber to R1. As used herein, "parabolic" therefore includes substantially parabolically shaped refractive index profiles which may vary slightly from an a value of 2.00 at one or more points in the core, as well as profiles with minor variations and/or a centerline dip. Referring to the Figures, the core 20 is defined to end at the radius R1 where the parabolic shape ends, coinciding with the innermost radius of the cladding 200.

One or more portions of the clad layer 200 may be comprised of a cladding material which was deposited, for example during a laydown process, or which was provided in the form of a jacketing, such as a tube in a rod-in-tube optical preform arrangement, or a combination of deposited material and a jacket. The clad layer 200 is surrounded by at least one coating 210, which may in some embodiments comprise a low modulus primary coating and a high modulus secondary coating.

Preferably, the optical fiber disclosed herein has a silica-based core and cladding. In some embodiments, the cladding has an outer diameter, 2 times Rmax, of about 125 μm. Preferably, the outer diameter of the cladding has a constant diameter along the length of the optical fiber. In some embodiments, the refractive index of the optical fiber has radial symmetry. Preferably, the outer diameter of the core has a constant diameter along the length of the optical fiber. In some embodiments, one or more coatings surround and are in contact with the cladding. The coating can be a polymer coating such as an acrylate-based polymer. In some embodiments, the coating has a constant diameter, radially and along the length of the fiber.

In some embodiments, the depressed-index annular portion comprises holes, either non-periodically disposed, or periodically disposed, or both. By "non-periodically disposed" or "non-periodic distribution", we mean that when one takes a cross section (such as a cross section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross sections will have different hole patterns, wherein the distributions of holes and sizes of holes do not match. That is, the holes or holes are non-periodic, i.e., they are not periodically disposed within the fiber structure. These holes are stretched (elongated) along the length (i.e. parallel to the longitudinal axis) of the optical fiber, but do not extend the entire length of the entire fiber for typical lengths of transmission fiber. While not wishing to be bound by theory, it is believed that the holes extend less than a few meters, and in many cases less than 1 meter along the length of the fiber. Optical fiber disclosed herein can be made by methods which utilize preform consolidation conditions which are effective to result in a significant amount of gases being trapped in the consolidated glass blank, thereby causing the formation of holes in the consolidated glass optical fiber preform. Rather than taking steps to remove these holes, the resultant preform is used to form an optical fiber with holes, or holes, therein. As used herein, the diameter of a hole is the longest line segment whose endpoints are disposed on the silica internal surface defining the hole when the optical fiber is viewed in perpendicular cross-section transverse to the longitudinal axis of the fiber. Methods of making such optical fibers with holes is described in U.S. patent application Ser. No. 11/583,098, the specification of which is incorporated herein by reference in its entirety.

I. Offset Depressed-Index Annular Portion

Referring to FIGS. 1-4, multimode optical waveguide fibers in a first aspect are disclosed herein which comprise: a core 20 extending radially outwardly from the centerline to a core outer radius, R1, and having a relative refractive index profile, $\Delta_1(r)$, in %, with a maximum relative refractive index percent, $\Delta_{1MAX}$; and, a cladding 200 surrounding and directly adjacent, i.e. in direct contact with, the core 20. In the first aspect, the reference index $n_{REF}$ is the refractive index at the core/clad interface, i.e. at R1.

Figure 1:
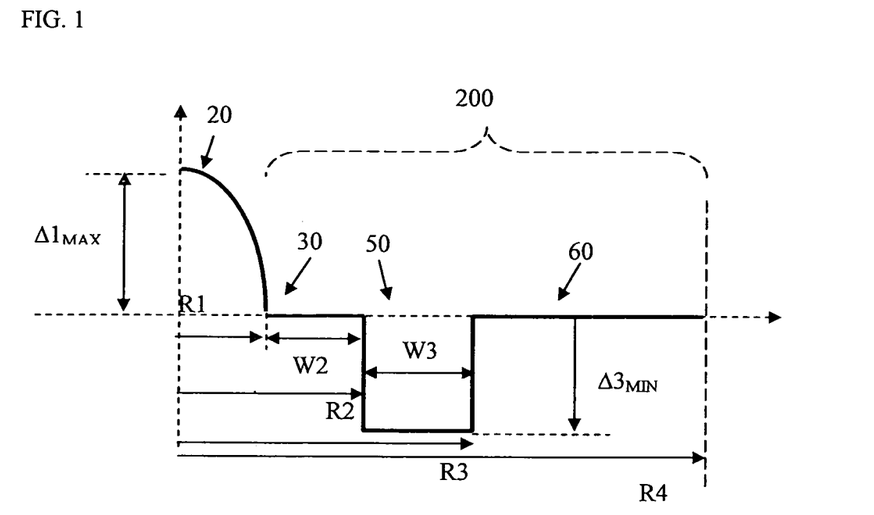
FIG. 1 shows a schematic representation (not to scale) of the refractive index profile of a cross-section of the glass portion of an embodiment of a first aspect of multimode optical fiber disclosed herein wherein the depressed-index annular portion is offset from the core and is surrounded by an outer annular portion.
Figure 2:
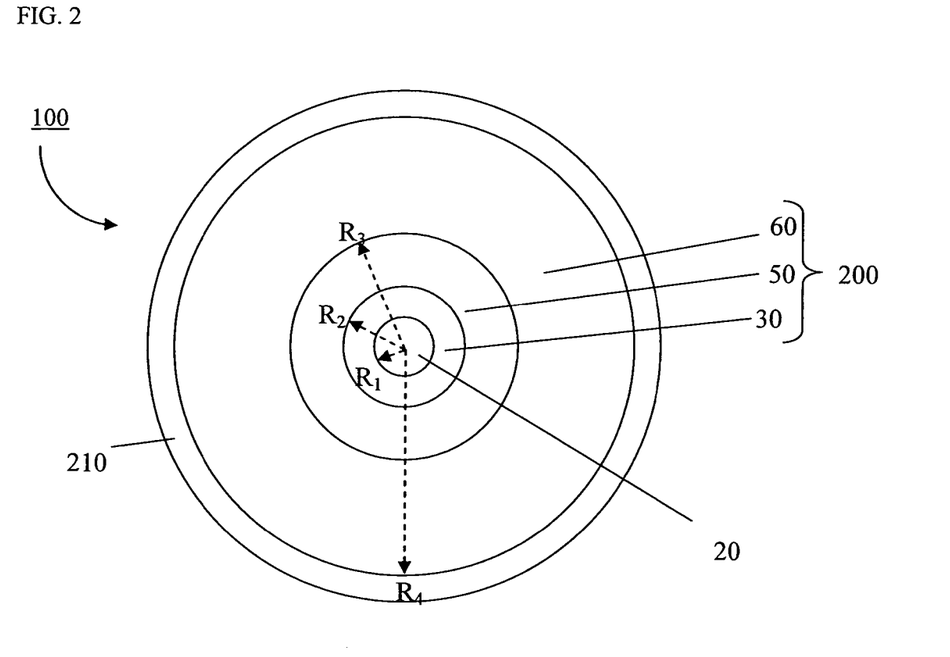
FIG. 2 is a schematic representation (not to scale) of a cross-sectional view of the optical waveguide fiber of FIG. 1.

FIG. 1 shows a schematic representation of the refractive index profile of a cross-section of the glass portion of an embodiment of a multimode optical fiber comprising a glass core 20 and a glass cladding 200, the cladding comprising an inner annular portion 30, a depressed-index annular portion 50, and an outer annular portion 60. FIG. 2 is a schematic representation (not to scale) of a cross-sectional view of the optical waveguide fiber of FIG. 1. The depressed-index annular portion 50 is shown offset, or spaced away, from the core 20 by the inner annular portion 30. The annular portion 50 surrounds and contacts the inner annular portion 30. The outer annular portion 60 surrounds and contacts the annular portion 50. The inner annular portion 30 has a refractive index profile $\Delta 2(r)$ with a maximum relative refractive index $\Delta 2_{MAX}$, and a minimum relative refractive index $\Delta 2_{MIN}$, where in some embodiments $\Delta 2_{MAX} = \Delta 2_{MIN}$. The depressed-index annular portion 50 has a refractive index profile $\Delta 3(r)$ with a minimum relative refractive index $\Delta 3_{MIN}$. The outer annular portion 60 has a refractive index profile $\Delta 4(r)$ with a maximum relative refractive index $\Delta 4_{MAX}$, and a minimum relative refractive index $\Delta 4_{MIN}$, where in some embodiments $\Delta 4_{MAX} = \Delta 4_{MIN}$. Also, $\Delta 1_{MAX} > \Delta 2_{MAX} > \Delta 2_{MIN} > \Delta 3_{MIN}$, and $\Delta 1_{MAX} > \Delta 4_{MAX} > \Delta 4_{MIN} > \Delta 3_{MIN}$. In some embodiments, the inner annular portion 30 has a substantially constant refractive index profile, as shown in FIG. 1 with a constant $\Delta 2(r)$; in some of these embodiments, $\Delta 2(r) = 0\%$. In some embodiments, the outer annular portion 60 has a substantially constant refractive index profile, as shown in FIG. 1 with a constant $\Delta 4(r)$; in some of these embodiments, $\Delta 4(r) = 0\%$. The core 20 has an entirely positive refractive index profile, where $\Delta 1(r) > 0\%$. In some embodiments, the inner annular portion 30 has a relative refractive index profile $\Delta 2(r)$ having a maximum absolute magnitude less than 0.05%, and $\Delta 2_{MAX} < 0.05\%$ and $\Delta 2_{MIN} > -0.05\%$, and the depressed-index annular portion 50 begins where the relative refractive index of the cladding first reaches a value of less than –0.05%, going radially outwardly from the centerline. In some embodiments, the outer annular portion 60 has a relative refractive index profile $\Delta 4(r)$ having a maximum absolute magnitude less than 0.05%, and $\Delta 4_{MAX} < 0.05\%$ and $\Delta 4_{MIN} > -0.05\%$, and the depressed-index annular portion 50 ends where the relative refractive index of the cladding first reaches a value of greater than –0.05%, going radially outwardly from the radius where $\Delta 3MIN$ is found. In some embodiments, the inner annular portion 30 comprises pure silica. In some embodiments, the outer annular portion 60 comprises pure silica. In some embodiments, the depressed-index annular portion 50 comprises pure silica comprising with a plurality of holes. Preferably, the minimum relative refractive index, or average effective relative refractive index, such as taking into account the presence of any holes, of the depressed-index annular portion 50 is preferably less than –0.1%. The holes can contain one or more gases, such as argon, nitrogen, or oxygen, or the holes can contain a vacuum with substantially no gas; regardless of the presence or absence of any gas, the refractive index in the annular portion 50 is lowered due to the presence of the holes. The holes can be randomly or non-periodically disposed in the annular portion 50 of the cladding 200, and in other embodiments, the holes are disposed periodically in the annular portion 50. In some embodiments, the plurality of holes comprises a plurality of non-periodically disposed holes and a plurality of periodically disposed holes. Alternatively, or in addition, the depressed index in annular portion 50 can also be provided by downdoping the annular portion 50 (such as with fluorine) or updoping one or more portions of the cladding and/or the core, wherein the depressed-index annular portion 50 is, for example, pure silica or silica which is not doped as heavily as the inner annular portion 30.

In one set of embodiments, the multimode optical fiber comprises a graded-index, preferably parabolic (substantially parabolic), glass core 20 and glass cladding 200 as depicted in FIG. 1, wherein the core ends at a radius R1, which marks the end of the graded index core or parabolic shape. The core 20 is surrounded by and in direct contact with the inner annular portion 30, which has a substantially constant refractive index profile $\Delta 2(r)$. The inner annular portion 30 is surrounded by and in direct contact with the depressed-index annular portion 50, and the depressed-index annular portion 50 is surrounded by and in direct contact with the outer annular portion 60, which has a substantially constant refractive index profile $\Delta 4(r)$. The depressed-index annular portion 50 may comprise a plurality of holes. In some of this set of embodiments, the core 20 comprises germania doped silica, the inner annular portion 30 comprises pure silica, and the outer annular portion 60 comprises pure silica; in some of these embodiments, the depressed-index annular portion 50 comprises hole-free fluorine-doped silica; in others of these embodiments, the depressed-index annular portion 50 comprises a plurality of holes in pure silica; and in yet others of these embodiments, the depressed-index annular portion 50 comprises a plurality of holes in fluorine-doped silica. In embodiments where the inner annular portion 30 comprises pure silica and the depressed-index annular portion 50 comprises pure silica with a plurality of holes, the depressed-index annular portion 50 starts at the innermost radius of the innermost hole. In embodiments where the outer annular portion 60 comprises pure silica, and the depressed-index annular portion 50 comprises pure silica with a plurality of holes, the depressed-index annular portion 50 ends at the outermost radius of the outermost hole.

Preferably, the inner annular portion 30 has a radial width of greater than 4 microns. In some embodiments, the minimum relative refractive index of the depressed-index annular portion 50, $\Delta 3MIN$, is less than –0.10%; in other embodiments, $\Delta 3MIN$ is less than –0.20%; in still other embodiments, $\Delta 3MIN$ is less than –0.30%; in yet other embodiments, $\Delta 3MIN$ is less than –0.40%.

$\Delta 1_{MAX}$ is preferably less than or equal to 2.0%, more preferably less than or equal to 1.0%, even more preferably less than 1.0%, and still more preferably less than or equal to 0.8%; in some embodiments $\Delta 1_{MAX}$ is greater than or equal to 0.4% and less than or equal to 1.0%, and in other embodiments $\Delta 1_{MAX}$ is greater than or equal to 0.5% and less than or equal to 0.75%.

The numerical aperture (NA) of the optical fiber is preferably greater than the NA of the optical source directing signals into the fiber; for example, the NA of the optical fiber is preferably greater than the NA of a VCSEL source. The bandwidth of the multimode optical fiber varies inversely with the square of $\Delta 1_{MAX}$. For example, a multimode optical fiber with $\Delta1_{MAX}$ of 0.5% can yield a bandwidth 16 times greater than an otherwise identical multimode optical fiber except having a core with $\Delta1_{MAX}$ of 2.0%.

In some embodiments, the core outer radius, R1, is preferably not less than 12.5 µm and not more than 40 µm, i.e. the core diameter is between about 25 and 80 µm. In other embodiments, R1>20 microns; in still other embodiments, R1>22 microns; in yet other embodiments, R1>24 microns.

FIG. 2 is a schematic representation (not to scale) of a cross-sectional view of an optical waveguide fiber 100 as disclosed herein having core 20 and a cladding 200 directly adjacent and surrounding the core 20, the cladding 200 being comprised of an inner annular portion 30, a depressed-index annular portion 50, and an outer annular portion 60.

Referring to FIG. 1 as one exemplary depiction of a refractive index profile of a multimode optical fiber disclosed herein, the cladding 200 comprises: an inner annular portion 30 surrounding the core 20 and directly adjacent thereto, and extending radially outwardly to an inner annular portion outer radius, $R_2$, and having a width $W_2$ disposed at a midpoint $R_{2MID}$, the portion 30 having a relative refractive index profile, $\Delta_2(r)$ in %, with a maximum relative refractive index percent, $\Delta_{2MAX}$, in %, a minimum relative refractive index percent, $\Delta_{2MIN}$, in %, and a maximum absolute magnitude relative refractive index percent, $|\Delta_2(r)|_{MAX}$; a depressed-index annular portion (or "ring") 50 surrounding portion 30 and directly adjacent thereto, and extending radially outwardly from $R_2$ to a depressed-index annular portion radius, $R_3$, the portion 50 having a width $W_3$ disposed at a midpoint $R_{3MID}$, and having a relative refractive index profile, $\Delta_3(r)$ in %, with a minimum relative refractive index percent, $\Delta_{3MIN}$, in %, wherein $\Delta_{1MAX}>0>\Delta_{3MIN}$; and an outer annular portion 60 surrounding the portion 50 and directly adjacent thereto and having a relative refractive index percent, $\Delta_4(r)$ in %. $R_1$ is defined to occur at the radius where the parabolic core ends. That is, core 20 ends and the annular inner portion 30 starts at a radius R1, and portion 30 is defined to end at a radius R2. The depressed-index annular portion 50 begins at $R_2$ and ends at $R_3$. The width $W_3$ of the annular portion 50 is $R_3-R_2$ and its midpoint $R_{3MID}$ is $(R_2+R_3)/2$. In some embodiments, $|\Delta_2(r)|<0.025\%$ for more than 50% of the radial width of the annular inner portion 30, and in other embodiments $|\Delta_2(r)|<0.01\%$ for more than 50% of the radial width of the annular inner portion 30. Cladding 200 extends to a radius, $R_4$, which is also the outermost periphery of the glass part of the optical fiber. In some embodiments, $R_4>40$ µm; in other embodiments, $R_4>50$ µm, and in other embodiments, $R_4>60$ µm, and in some embodiments, 60 µm<$R_4$<70 µm.

In some embodiments, $W_3$ is greater than 0 and less than 30 µm. In other embodiments, $W_3$ is greater than 0.1 µm and less than 30 µm. In other embodiments, $W_3$ is greater than 1.0 µm and less than 10.0 µm.

In some embodiments, $\Delta_{3MIN}$ is less than (i.e. more negative than) 0.1%. In other embodiments, $\Delta_{3MIN}$ is less than −0.2%. In other embodiments, $\Delta_{3MIN}$ is less than −0.1% and greater than −3.0%.

In one set of embodiments, the optical fiber comprises a core 20 surrounded and contacted by a cladding 200, the cladding comprising an annular inner portion 30, a depressed-index annular portion 50, and an outer clad portion 60. The depressed-index annular portion 50 is spaced away from the core 20 by the annular inner portion 30. The annular portion 50 surrounds and contacts the inner portion 30. The outer clad portion 60 surrounds and contacts the annular portion 50. In some embodiments, the outer clad portion 60 has a substantially constant refractive index profile, and in some of these embodiments comprises pure silica, and in some of those embodiments, the outer clad portion 60 consists of pure silica. The core 20 has an entirely positive refractive index profile, where $\Delta1(r)>0\%$, and the refractive index profile of the core has an alpha shape, wherein α is about 2, and preferably α is between 1.8 and 2.3, more preferably α is between 1.95 and 2.05. The annular inner portion 30 has a relative refractive index profile $\Delta2(r)$ having a maximum absolute magnitude less than 0.05%, i.e. $\Delta2_{MAX}<0.05\%$ and $\Delta2_{MIN}>-0.05\%$, and in some embodiments comprises pure silica. The depressed-index annular portion 50 has an entirely negative refractive index profile, where $\Delta3(r)<0\%$, and $\Delta3_{MIN}<-0.1\%$.

In another set of embodiments, the optical fiber comprises a core 20 surrounded and contacted by a cladding 200, the cladding comprising an annular inner portion 30, a depressed-index annular portion 50, and an outer clad portion 60. The depressed-index annular portion 50 is spaced away from the core 20 by the annular inner portion 30. The annular portion 50 surrounds and contacts the inner portion 30. The outer clad portion 60 surrounds and contacts the annular portion 50. The outer clad portion 60 has a substantially constant refractive index profile, and in some of these embodiments comprises pure silica, and in some of those embodiments, the outer clad portion 60 consists of pure silica. In some embodiments, the core 20 has an entirely positive refractive index profile, where $\Delta1(r)>0\%$, and the refractive index profile of the core has an alpha shape, wherein α is about 2, and preferably α is between 1.8 and 2.3, more preferably α is between 1.95 and 2.05. The annular inner portion 30 has a relative refractive index profile $\Delta2(r)$ having a maximum absolute magnitude less than 0.05%, i.e. $\Delta2_{MAX}<0.05\%$ and $\Delta2_{MIN}>-0.05\%$, and in some embodiments comprises pure silica. The depressed-index annular portion 50 comprises a plurality of holes, which in some embodiments are disposed non-periodically throughout the annular portion 50. In some of these embodiments, the annular portion 50 comprises pure silica. The annular inner portion 30 and the outer clad portion 60 are both hole-free.

Figure 3:
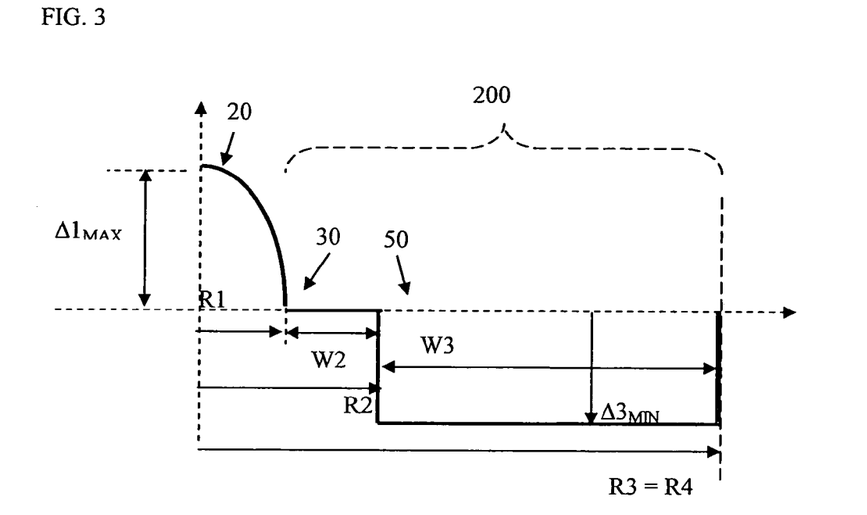
FIG. 3 shows a schematic representation (not to scale) of the refractive index profile of a cross-section of the glass portion of an embodiment of a first aspect of multimode optical fiber disclosed herein wherein the depressed-index annular portion is offset from the core and the depressed-index annular portion extends to the outermost periphery.
Figure 4:
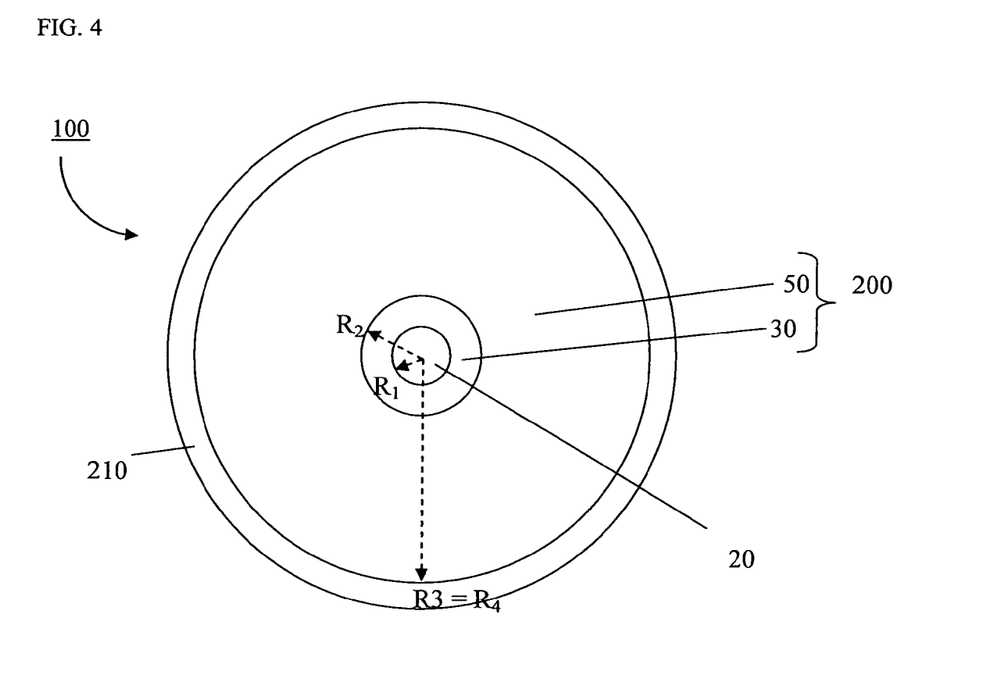
FIG. 4 is a schematic representation (not to scale) of a cross-sectional view of the optical waveguide fiber of FIG. 3.

FIG. 3 is a schematic representation of another set of embodiments of the first aspect of the multimode optical fiber disclosed herein. The depressed-index annular portion extends to and forms the outermost periphery of the cladding 200, i.e. to the outermost periphery of the glass portion of the optical fiber, such that R3=R4 in that case, and the outer annular portion 60 is not present. In embodiments where holes are present in the depressed-index annular portion 50, preferably at least a thin layer of silica forms an outermost glass skin, such that the holes do not open out onto the outermost periphery of the cladding. FIG. 4 is a schematic representation (not to scale) of a cross-sectional view of the optical waveguide fiber of FIG. 3.

II. Non-Offset Depressed-Index Annular Portion

Figure 5:
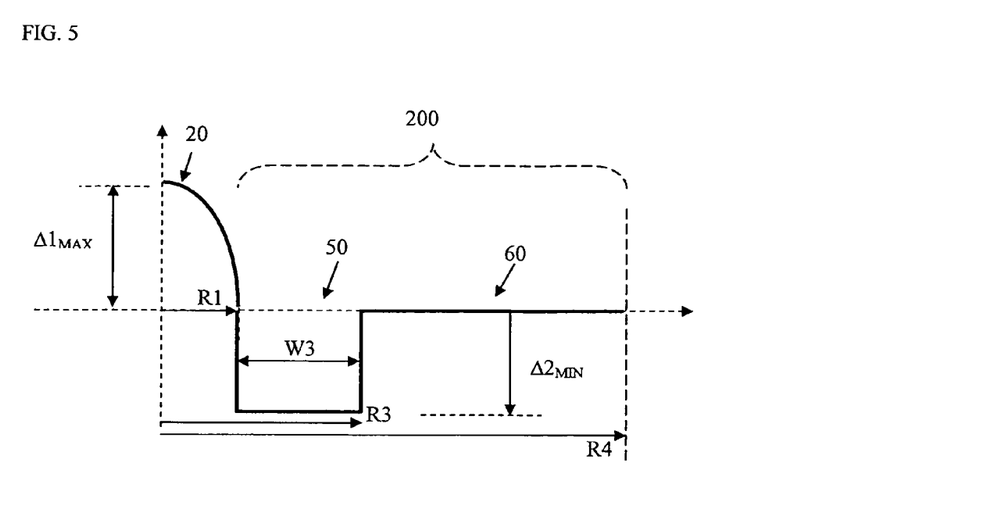
FIG. 5 shows a schematic representation (not to scale) of the refractive index profile of a cross-section of the glass portion of an embodiment of a second aspect of multimode optical fiber disclosed herein wherein the depressed-index annular portion is directly adjacent to the core.
Figure 6:
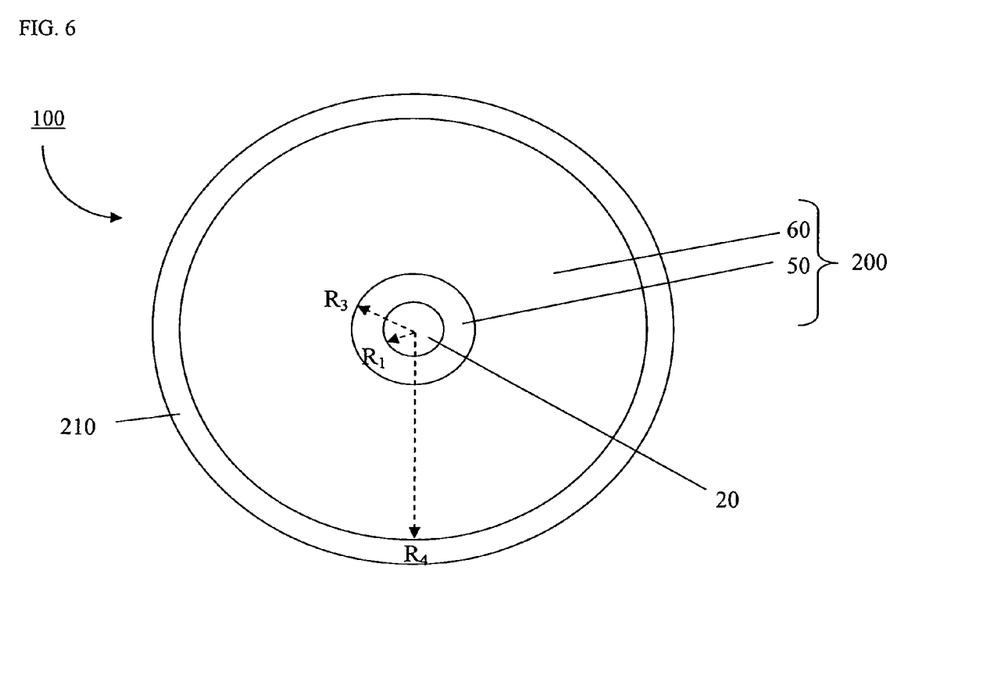
FIG. 6 is a schematic representation (not to scale) of a cross-sectional view of the optical waveguide fiber of FIG. 5.

Referring to FIGS. 5 and 6, multimode optical waveguide fibers in a second aspect are disclosed herein which comprise: a core 20 extending radially outwardly from the centerline to a core outer radius, $R_1$, and having a relative refractive index profile, $\Delta_1(r)$, in %, with a maximum relative refractive index percent, $\Delta_{1MAX}$; and, a cladding 200 surrounding and directly adjacent, i.e. in direct contact with, the core 20.

FIG. 5 shows a schematic representation of the refractive index profile of a cross-section of the glass portion of an embodiment of a multimode optical fiber comprising a glass core 20 and a glass cladding 200, the cladding comprising a depressed-index annular portion 50, and an outer annular portion 60. In the second aspect, $n_{REF}$ is the average refractive index of the outer annular portion 60 of the cladding 200. The depressed-index annular portion 50 is shown surrounding and in direct contact with (i.e. directly adjacent to) the core 20. The outer annular portion 60 surrounds and contacts the annular portion 50. The depressed-index annular portion 50 has a refractive index profile Δ3(r) with a minimum relative refractive index $\Delta3_{MIN}$. The outer annular portion 60 has refractive index profile Δ4(r), where in some embodiments Δ4(r) is constant across the entire portion 60, and in some of these embodiments Δ4(r)=0% across the entire portion 60, for example as shown in FIG. 6. Also, $\Delta1_{MAX}>0>\Delta3_{MIN}$. The core 20 has an entirely positive refractive index profile, where Δ1(r)>0%. In some embodiments, the depressed-index annular portion 50 ends where the relative refractive index of the cladding first reaches a value of greater than −0.05%, going radially outwardly from the radius where $\Delta3_{MIN}$ is found. In some embodiments, the outer annular portion 60 comprises pure silica. In some embodiments, the depressed-index annular portion 50 comprises pure silica comprising a plurality of holes. Preferably, the minimum relative refractive index, or average effective relative refractive index, such as taking into account the presence of any holes, of the depressed-index annular portion 50 is preferably less than −0.1%. The holes can contain one or more gases, such as argon, nitrogen, or oxygen, or the holes can contain a vacuum with substantially no gas; regardless of the presence or absence of any gas, the refractive index in the annular portion 50 is lowered due to the presence of the holes. The holes can be randomly or non-periodically disposed in the annular portion 50 of the cladding 200, and in other embodiments, the holes are disposed periodically in the annular portion 50. In some embodiments, the plurality of holes comprises a plurality of non-periodically disposed holes and a plurality of periodically disposed holes. Alternatively, or in addition, the depressed-index in annular portion 50 can also be provided by downdoping the annular portion 50 (such as with fluorine) or updoping the outer annular portion of the cladding and/or the core.

In one set of embodiments, the multimode optical fiber comprises a graded-index, preferably parabolic (substantially parabolic), glass core 20 and glass cladding 200 as depicted in FIG. 5, wherein the core ends at a radius R1, which marks the end of the graded index core or parabolic shape. The core 20 is surrounded by and in direct contact with the depressed-index annular portion 50, and the depressed-index annular portion 50 is surrounded by and in direct contact with the outer annular portion 60, which has a substantially constant refractive index profile Δ4(r). The depressed-index annular portion 50 may comprise a plurality of holes. In some of this set of embodiments, the core 20 comprises germania doped silica, and the outer annular portion 60 comprises pure silica; in some of these embodiments, the depressed-index annular portion 50 comprises hole-free fluorine-doped silica; in others of these embodiments, the depressed-index annular portion 50 comprises a plurality of holes in pure silica; and in yet others of these embodiments, the depressed-index annular portion 50 comprises a plurality of holes in fluorine-doped silica. In embodiments where the outer annular portion 60 comprises pure silica, and the depressed-index annular portion 50 comprises pure silica with a plurality of holes, the depressed-index annular portion 50 ends at the outermost radius of the outermost hole.

In some embodiments, $W_3$ is greater than 0 and less than 30 μm. In other embodiments, $W_3$ is greater than 0.1 μm and less than 30 μm. In other embodiments, $W_3$ is greater than 1.0 μm and less than 10.0 μm. In some embodiments, the minimum relative refractive index of the depressed-index annular portion 50, Δ3MIN, is less than −0.10%; in other embodiments, Δ3MIN is less than −0.20%; in still other embodiments, Δ3MIN is less than −0.30%; in yet other embodiments, Δ3MIN is less than −0.40%. In still other embodiments, the depressed-index annular portion 50 has no holes, Δ3MIN is less than −0.40%, and $W_3$ is less than or equal to 4.0 μm.

In some embodiments, $\Delta1_{MAX}$ is less than or equal to 0.80%; in other embodiments, $\Delta1_{MAX}$ is less than or equal to 0.70%; in still other embodiments, $\Delta1_{MAX}$ is less than or equal to 0.60%; and in some embodiments $\Delta1_{MAX}$ is greater than or equal to 0.40% and less than or equal to 0.80%, and in other embodiments $\Delta1_{MAX}$ is greater than or equal to 0.50% and less than or equal to 0.75%.

The numerical aperture (NA) of the optical fiber is preferably greater than the NA of the optical source directing signals into the fiber; for example, the NA of the optical fiber is preferably greater than the NA of a VCSEL source. The bandwidth of the multimode optical fiber varies inversely with the square of $\Delta1_{MAX}$. For example, a multimode optical fiber with $\Delta1_{MAX}$ of 0.5% can yield a bandwidth 16 times greater than an otherwise identical multimode optical fiber except having a core with $\Delta1_{MAX}$ of 2.0%.

In some embodiments, the core outer radius, R1, is preferably not less than 12.5 μm and not more than 40 μm, i.e. the core diameter is between about 25 and 80 μm. In other embodiments, R1>20 microns; in still other embodiments, R1>22 microns; in yet other embodiments, R1>24 microns.

FIG. 6 is a schematic representation (not to scale) of a cross-sectional view of an optical waveguide fiber 100 as disclosed herein having core 20 and a cladding 200 directly adjacent and surrounding the core 20, the cladding 200 being comprised of a depressed-index annular portion 50, and an outer annular portion 60.

Referring to FIG. 5 as one exemplary depiction of a refractive index profile of a multimode optical fiber disclosed herein, the cladding 200 comprises: depressed-index annular portion (or "ring") 50 surrounding the core 20 and directly adjacent thereto, and extending radially outwardly from $R_1$ to an depressed-index annular portion radius, $R_3$, the portion 50 having a width $W_3$ disposed at a midpoint $R_{3MID}$, and having a relative refractive index profile, $\Delta_3(r)$ in %, with a minimum relative refractive index percent, $\Delta_{3MIN}$, in %, wherein $\Delta_{1MAX}>0>\Delta_{3MIN}$; and an outer annular portion 60 surrounding the portion 50 and directly adjacent thereto and having a relative refractive index percent, $\Delta_4(r)$ in %. $R_1$ is defined to occur at the radius where the parabolic core ends. That is, core 20 ends and the annular portion 50 starts at a radius R1, and portion 50 is defined to end at a radius $R_3$. The width $W_3$ of the annular portion 50 is $R_3-R_1$ and its midpoint $R_{3MID}$ is $(R_1+R_3)/2$. Cladding 200 extends to a radius, $R_4$, which is also the outermost periphery of the glass part of the optical fiber. In some embodiments, $R_4>40$ μm; in other embodiments, $R_4>50$ μm, and in other embodiments, $R_4>60$ μm, and in some embodiments, 60 μm $<R_4<70$ μm.

In some embodiments, $W_3$ is greater than 0 and less than 30 μm. In other embodiments, $W_3$ is greater than 0.1 μm and less than 30 μm. In other embodiments, $W_3$ is greater than 1.0 μm and less than 10.0 μm.

In some embodiments, $\Delta_{3MIN}$ is less than (i.e. more negative than) −0.1%. In other embodiments, $\Delta_{3MIN}$ is less than −0.2%. In other embodiments, $\Delta_{3MIN}$ is less than −0.1% and greater than −3.0%.

In one set of embodiments, the optical fiber comprises a core 20 surrounded and contacted by a cladding 200, the cladding comprising a depressed-index annular portion 50, and an outer clad portion 60. The depressed-index annular portion 50 is directly adjacent to the core 20. The annular portion 50 surrounds and contacts the core 20. The outer clad portion 60 surrounds and contacts the annular portion 50. In some embodiments, the outer clad portion 60 has a substantially constant refractive index profile, and in some of these embodiments comprises pure silica, and in some of those embodiments, the outer clad portion 60 consists of pure silica. The core 20 has an entirely positive refractive index profile, where Δ1(r)>0%, and the refractive index profile of the core has an alpha shape, wherein α is about 2, and preferably α is between 1.8 and 2.3, more preferably between 1.95 and 2.05. The depressed-index annular portion 50 has an entirely negative refractive index profile, where Δ3(r)<0%, and $\Delta 3_{MIN}$<−0.1%.

In another set of embodiments, the optical fiber comprises a core 20 surrounded and contacted by a cladding 200, the cladding comprising a depressed-index annular portion 50, and an outer clad portion 60. The depressed-index annular portion 50 is directly adjacent to the core 20. The annular portion 50 surrounds and contacts the core 20. The outer clad portion 60 surrounds and contacts the annular portion 50. The outer clad portion 60 has a substantially constant refractive index profile, and in some of these embodiments comprises pure silica, and in some of those embodiments, the outer clad portion 60 consists of pure silica. In some embodiments, the core 20 has an entirely positive refractive index profile, where Δ1(r)>0%, and the refractive index profile of the core has an alpha shape, wherein α is about 2, and preferably α is between 1.8 and 2.3, more preferably α is between 1.95 and 2.05. The depressed-index annular portion 50 comprises a plurality of holes, which in some embodiments are disposed non-periodically throughout the annular portion 50. In some of these embodiments, the annular portion 50 comprises pure silica with holes. The outer clad portion 60 is hole-free.

A number of examples of the optical fiber disclosed herein were made and measured for bend performance, as were several comparative optical fibers.

Example 1

Comparative

A first sample was Corning Incorporated InfiniCor® 50 μm optical fiber having a 125 micron glass diameter comprising a 50 micron diameter core of GeO2-SiO2 graded index (1% maximum Δ relative to the pure silica cladding) with a parabolic (α=2) shape) and a solid silica cladding (with no depressed annular region).

Example 2

490 grams of SiO2 (0.36 g/cc density) soot were flame deposited onto a 1 meter long×25.8 mm diameter solid glass cane of GeO2-SiO2 graded index core (1% maximum refractive index relative to pure silica with a parabolic (α=2) shape) and having thin silica cladding wherein the cane had a core/clad (clad=cane diameter) ratio of 0.98. This assembly was then sintered as follows. The assembly was first dried for 2 hours in an atmosphere consisting of helium and 3 percent chlorine at 1000° C. followed by down driving at 32 mm/min through a hot zone set at 1500° C. in a 100 percent oxygen atmosphere, then re-down-driven through the hot zone at 25 mm/min in the same atmosphere, then final sintered in 100 percent oxygen at 6 mm/min, in order to sinter the soot to an "oxygen-seeded" first overclad preform. The preform was placed for 24 hours in an argon purged holding oven set at 1000° C. The preform was then placed on a lathe where 4900 grams of SiO2 containing 2.1 weight percent GeO2 soot (0.44 g/cc density) were flame deposited onto the 1 meter long void-free GeO2-SiO2 graded index core, void-free silica near clad, "oxygen-seeded" first overclad preform. This assembly was then sintered as follows. The assembly was first dried for 2 hours in an atmosphere consisting of helium and 3 percent chlorine at 1000° C. followed by down driving at 6 mm/min through a hot zone set at 1500° C. in a 100 percent helium atmosphere, in order to sinter the soot to a void-free GeO2-SiO2 graded index core, surrounded by a void-free silica near clad, surrounded by an "oxygen-seeded" silica ring surrounded by an oxygen-seeded silica-germania ring then surrounded by a void-free silica-germania (0.1 percent maximum delta at 850 nm) clear glass final overclad optical preform. The preform was placed for 24 hours in an argon purged holding oven set at 1000° C. The preform was drawn to three 10 km lengths of 125 micron diameter fiber using a draw furnace having a hot zone of about 20 cm length and set at approximately 2000° C., wherein the first 10 Km length was drawn at 10 m/s without spinning and the second and third 10 Km lengths were drawn at 10 m/s and 20 m/s, respectively, followed by conventional bidirectional spinning of the fiber prior to being wound onto storage spool.

SEM image analysis at 900 fold magnification of the end face of these fibers showed a 25 micron radius void-free solid silica-germania core surrounded by an approximate 0.5 micron void-free silica inner cladding (total ring thickness, W2, of approximately 0.5 microns radially), surrounded by a 29.5 micron outer radius void containing near clad region comprising holes of approximately 0.3 micron diameter surrounded by 33.5 micron outer radius void containing cladding region comprising holes of approximately 3 micron diameter (total ring thickness, W3, of approximately 8 microns radially) which is surrounded by a void-free silica-germania outer cladding having an outer diameter of about 125 microns (all radial dimensions measured from the center of the optical fiber). The overall void containing ring region comprised 3.4 percent regional area percent holes (100 percent O2 by volume) in that area with an average diameter of 0.65 microns and the smallest diameter holes at 0.025 microns and a maximum diameter of 5.2 microns, resulting in about 300 total number of holes in the fiber cross-section. The total fiber void area percent (area of the holes divided by total area of the optical fiber cross-section×100) was about 0.65 percent. For the 20 m/s spun fiber, the measured bandwidth at 850 nm was greater than 2.00 GHz-km (in particular, 2.03 GHz-km) and the 1 turn by 10 mm diameter mandrel wrap bend attenuation increase at 1550 nm was 0.1 dB and at 850 nm was about 0.5 dB. Thus, the bend loss of 0.1 was less than the product of two times $(1/\Delta 1MAX)^2$, or $2(\frac{1}{1})2=2$ dB. The fiber core had a 50 micron diameter core of GeO2-SiO2 graded index (1% maximum Δ) with a parabolic (α=2) shape). For the 10 m/s spun fiber, the measured bandwidth at 850 nm was greater than 1.50 GHz-km (in particular, 1.86 GHz-km) and the 1 turn by 10 mm diameter mandrel wrap bend attenuation increase at 1550 nm was 0.1 dB and at 850 nm was about 0.5 dB. For the 10 m/s un-spun fiber, the measured bandwidth at 850 nm was greater than 0.75 GHz-km (in particular, 1.47 GHz-km) and the 1 turn by 10 mm diameter mandrel wrap bend attenuation increase at 1550 nm was 0.1 dB and at 850 nm was about 0.5 dB.

Example 3

520 grams of SiO2 (0.27 g/cc density) soot were flame deposited onto a 1 meter long×26.4 mm diameter solid glass cane of GeO2-SiO2 graded index (1% maximum delta index relative to pure silica) with a parabolic (α=2) shape) and having thin silica cladding wherein the cane had a core/clad (clad=cane diameter) ratio of 0.98. This assembly was then sintered as follows. The assembly was first dried for 2 hours in an atmosphere consisting of helium and 3 percent chlorine at 1125° C. followed by fluorine doping the soot preform in an atmosphere consisting of helium and 20 percent SiF$_4$ at 1125° C. for 4 hours then down driving at 14 mm/min through a hot zone set at 1480° C. in a 100 percent helium atmosphere in order to sinter the soot to a germania-silica core, fluorine-doped silica-ring first overclad preform. The preform was placed for 24 hours in an argon purged holding oven set at 1000° C. This preform was then placed back on a lathe where 4900 grams of SiO2 containing 2.1 weight percent GeO2 soot (0.44 g/cc density) were flame deposited onto the 1 meter long GeO2-SiO2 graded index core cane, fluorine doped silica ring first overclad preform. This assembly was then sintered as follows. The assembly was first dried for 2 hours in an atmosphere consisting of helium and 3 percent chlorine at 1000° C. followed by down driving at 6 mm/min through a hot zone set at 1500° C. in a 100 percent helium atmosphere, in order to sinter the soot to a void-free GeO2-SiO2 graded index core, surrounded by a thin void-free silica inner cladding, surrounded by a void-free fluorine-doped silica ring further surrounded by a void-free silica-germania (0.1 percent delta) clear glass final overclad optical preform. The preform was placed for 24 hours in an argon purged holding oven set at 1000° C. The preform was drawn to a 10 km length of 125 micron diameter fiber at 20 m/s using a draw furnace having a hot zone of about 20 cm length and set at approximately 2000° C. Optical analysis of the end face of a fiber showed a void-free optical fiber comprised of a 25 micron radius solid void-free silica-gernana core surrounded by an approximate 0.5 micron void-free silica inner cladding (total ring thickness, W2, of approximately 0.5 microns radially), surrounded by a 30.5 micron outer radius (total ring thickness, W3, 5 μm thick radial distance) void-free fluorine-containing ring (−0.4 percent delta verses silica) and a void-free germania-silica containing final overclad. The fiber attenuation at 850 nm and 1550 nm was 2.6 dB/Km and 0.35 dB/Km, respectively. The 1 turn by 10 mm diameter mandrel wrap bend attenuation increase at 850 nm and 1550 nm was approximately 0.42 and 0.45 dB, respectively. Thus, the bend loss of 0.5 at 1550 nm was less than the product of two times $(1/\Delta 1MAX)^2$, or $2(1/1)^2=2$ dB. The fiber core had a 50 micron diameter core of GeO2-SiO2 graded index (1% maximum Δ) with a parabolic (α=2) shape).

Example 4

Comparative

A fourth sample was Corning Incorporated InfiniCor® 62.5 μm optical fiber having a 125 micron glass diameter comprising a 62.5 micron diameter core of hole-free GeO2-SiO2 graded index (2% maximum Δ relative to the pure silica cladding) with a parabolic (α=2) shape) and a hole-free solid silica cladding (with no depressed annular region).

Example 5

1200 grams of SiO2 (0.47 g/cc density) soot were flame deposited onto a 1 meter long×15 mm diameter solid glass cane of GeO2-SiO2 graded index (2% maximum refractive index relative to pure silica with a parabolic (α=2) shape). This assembly was then sintered as follows. The assembly was first dried for 2 hours in an atmosphere consisting of helium and 3 percent chlorine at 1000° C. followed by down driving at 32 mm/min through a hot zone set at 1500° C. in a 100 percent oxygen atmosphere, then re-down-driven through the hot zone at 25 mm/min in the same atmosphere, then final sintered in 100 percent oxygen at 6 mm/min, in order to sinter the soot to an "oxygen-seeded" overclad preform. The preform was placed for 24 hours in an argon purged holding oven set at 1000° C. The preform was then drawn to a 10 km length of 125 micron diameter fiber at 20 m/s using a draw furnace having a hot zone of about 20 cm length and set at approximately 2000° C. SEM image analysis at 800 fold magnification of the end face of a fiber showed a 62.5 micron diameter hole-free silica-germania core and a 125 micron diameter silica cladding containing approximately 9.0 volume percent holes (containing oxygen), beginning at the core edge and being distributed throughout the cladding to approximately the outer diameter of the fiber, with a W3 of about 60 microns, with a mean hole diameter of 0.45 microns, the smallest diameter holes at 0.03 microns, a maximum diameter of 1.2 microns with a standard deviation of 0.21 microns, and comprising approximately 3000 holes in the fiber cross-section. The total fiber hole area percent (area of the holes divided by total area of the optical fiber cross-section×100) was about 6.8 percent. Measured multimode attenuation for this fiber was 3.00, 0.74 and 0.45 dB/Km at 850, 1310 and 1550 nm. Optical bend performance measurements showed an increase of less than 0.03 dB and less than 0.01 dB increase in attenuation at 850 and 1550 nm, respectively, when the fiber was wrapped once around a mandrel having a 5 mm radius. The fiber core had a 62.5 micron diameter core of GeO2-SiO2 graded index (2% maximum Δ) with a parabolic (α=2) shape).

Example 6

Comparative 1590 grams of SiO2 (0.49 g/cc density) soot were flame deposited onto a 1 meter long×15 mm diameter solid glass cane of GeO2-SiO2 graded index (0.5% maximum delta relative to pure silica) with a parabolic (α=2) shape). This assembly was then sintered as follows. The assembly was first dried for 2 hours in an atmosphere consisting of helium and 3 percent chlorine at 1000° C. followed by down driving at 6 mm/min through a hot zone set at 1500° C. in a 100 percent helium atmosphere, in order to sinter the soot to a hole-free clear glass optical preform overclad preform. The preform was placed for 24 hours in an argon purged holding oven set at 1000° C. The optical preform was drawn to a 10 km length of 125 micron diameter fiber at 10 m/s using a draw furnace having a hot zone of about 20 cm length and set at approximately 2000° C. This yielded an optical fiber with a 125 micron diameter fiber which comprised a 50 micron diameter core of void-free GeO2-SiO2 graded index (0.5% maximum delta) with a parabolic (α=2) shape) and a void-free solid silica cladding.

Example 7

120 grams of SiO2 (0.40 g/cc density) soot were flame deposited onto a 1 meter long×14.5 mm diameter solid glass cane of GeO2-SiO2 graded index (0.5% maximum delta relative to pure silica) with a parabolic (α=2) shape) and having silica cladding wherein the cane had a core/clad (clad=cane diameter) ratio of 0.90. This assembly was then sintered as follows. The assembly was first dried for 2 hours in an atmosphere consisting of helium and 3 percent chlorine at 1000° C. followed by down driving at 200 mm/min (corresponding to approximately a 100° C./min temperature increase for the outside of the soot preform during the downdrive process) through a hot zone set at 1490° C. in a 100 percent argon sintering atmosphere. The preform assembly was then redown-driven (i.e., a second time) through the hot zone at 100 mm/min (corresponding to approximately a 50° C./min temperature increase for the outside of the soot preform during the downdrive process). The preform assembly was then re-down-driven (i.e., a third time) through the hot zone at 50 mm/min (corresponding to approximately a 25° C./min temperature increase for the outside of the soot preform during the downdrive process). The preform assembly was then re-down-driven (i.e., a forth time) through the hot zone at 25 nm/min (corresponding to approximately a 12.5° C./min temperature increase for the outside of the soot preform during the downdrive process), then final sintered at 6 mm/min (approximately 3° C./min heat up rate) in order to sinter the soot into a argon-seeded first overclad preform. The first series of higher downfeed rate were employed to glaze the outside of the optical fiber preform, which facilitates trapping of the gases in the preform. The preform was then placed for 24 hours in an argon purged holding oven set at 1000° C. This preform was then placed back on a lathe where 1450 grams of SiO2 soot (0.63 g/cc density) were flame deposited onto the 1 meter long GeO2-SiO2 graded index core, "argon-seeded" first overclad preform. This assembly was then sintered as follows. The assembly was first dried for 2 hours in an atmosphere consisting of helium and 3 percent chlorine at 1000° C. followed by down driving at 6 mm/min through a hot zone set at 1500° C. in a 100 percent helium atmosphere, in order to sinter the soot to a void-free GeO2-SiO2 graded index core, void-free silica inner cladding, argon-containing void silica ring, void-free silica clear glass final overclad optical preform. The preform was placed for 24 hours in an argon purged holding oven set at 1000° C. The preform was drawn to a 10 km length of 125 micron diameter fiber at 10 m/s using a draw furnace having a hot zone of about 20 cm length and set at approximately 2000° C. The fiber had a 25 micron radius void-free core of GeO2-SiO2 graded index (0.5% maximum $\Delta$) with a parabolic ($\alpha$=2) shape surrounded an approximate 2.5 micron void-free silica inner cladding (total ring thickness, W2, of approximately 2.5 microns radially), surrounded by a void-containing ring with voids of about 0.3 micron diameter and W3 of about 5 microns, surrounded by a void-free silica clear glass outer annular portion.

Example 8

120 grams of SiO2 (0.40 g/cc density) soot were flame deposited onto a 1 meter long×14.9 mm diameter solid glass cane of GeO2-SiO2 graded index (0.5% maximum delta index relative to pure silica) with a parabolic ($\alpha$=2) shape) and having silica cladding wherein the cane had a core/clad (clad=cane diameter) ratio of 0.90. This assembly was then sintered as follows. The assembly was first dried for 2 hours in an atmosphere consisting of helium and 3 percent chlorine at 1125° C. followed by fluorine doping the soot preform in an atmosphere consisting of helium and 20 percent SiF$_4$ at 1125° C. for 4 hours then down driving at 14 mm/min through a hot zone set at 1480° C. in a 100 percent helium atmosphere in order to sinter the soot to a germania-silica core, silica inner cladding, fluorine-doped silica-ring first overclad preform. The preform was placed for 24 hours in an argon purged holding oven set at 1000° C. This preform was then placed back on a lathe where 1450 grams of SiO2 soot (0.49 g/cc density) were flame deposited onto the 1 meter long GeO2-SiO2 graded index core, silica inner cladding, fluorine-doped silica ring first overclad preform. This assembly was then sintered as follows. The assembly was first dried for 2 hours in an atmosphere consisting of helium and 3 percent chlorine at 1000° C. followed by down driving at 6 mm/min through a hot zone set at 1500° C. in a 100 percent helium atmosphere, in order to sinter the soot to a void-free GeO2-SiO2 graded index core, void-free silica inner cladding, void-free fluorine-doped silica ring, void-free silica clear glass final overclad optical preform. The preform was placed for 24 hours in an argon purged holding oven set at 1000° C. The preform was drawn to a 10 km length of 125 micron diameter fiber at 10 m/s using a draw furnace having a hot zone of about 20 cm length and set at approximately 2000° C. The fiber had a 25 micron radius void-free core of GeO2-SiO2 graded index (0.5% maximum $\Delta$) with a parabolic ($\alpha$=2) shape surrounded an approximate 2.5 micron void-free silica inner cladding (total ring thickness, W2, of approximately 2.5 microns radially), surrounded and void-free fluorine-doped silica ring with a W3 of about 5 microns, surrounded by a void-free silica clear glass outer annular portion.

Example 9

420 grams of SiO2 (0.36 g/cc density) soot were flame deposited onto a 1 meter long×25 mm diameter solid glass cane of GeO2-SiO2 graded index core (1% maximum refractive index relative to pure silica with a parabolic ($\alpha$=2) shape) and having a silica cladding wherein the cane had a core/clad (clad=cane diameter) ratio of 0.70. This assembly was then sintered as follows. The assembly was first dried for 2 hours in an atmosphere consisting of helium and 3 percent chlorine at 1000° C. followed by down driving at 32 mm/min through a hot zone set at 1500° C. in a 100 percent argon atmosphere, then re-down-driven through the hot zone at 25 mm/min in the same atmosphere, then final sintered in 100 percent argon at 6 mm/min, in order to sinter the soot to an "argon-seeded" first overclad preform. The preform was placed for 24 hours in an argon purged holding oven set at 1000° C. The preform was then placed on a lathe where 4200 grams of SiO2 soot (0.44 g/cc density) were flame deposited onto the 1 meter long GeO2-SiO2 graded index core, silica inner clad, "argon-seeded" first overclad preform. This assembly was then sintered as follows. The assembly was first dried for 2 hours in an atmosphere consisting of helium and 3 percent chlorine at 1000° C. followed by down driving at 6 mm/min through a hot zone set at 1500° C. in a 100 percent helium atmosphere, in order to sinter the soot to a void-free GeO2-SiO2 graded index core, surrounded by a void-free silica inner cladding, surrounded by an "argon-seeded" silica ring surrounded by void-free silica final overclad optical preform. The preform was placed for 24 hours in an argon purged holding oven set at 1000° C. The preform was drawn to a two 10 km lengths of 125 micron diameter fiber at 20 m/s using a draw furnace having a hot zone of about 20 cm length and set at approximately 2000° C., wherein the first 10 Km portion was non spun and the second 10 Km length was followed by conventional bidirectional spinning of the fiber prior to being wound onto storage spool.

Optical image analysis of the end face of a fiber showed a 25 micron radius void-free solid silica-germania core, surrounded by an approximate 12.5 micron void-free radius silica inner cladding (total ring thickness, W2, of approximately 12.5 microns radially), surrounded by an approximate 5 micron radius void-containing near clad silica ring having approximately 100 voids of approximately 300 nm in diameter in cross-section (total ring thickness, W3, of approximately 5 microns radially), which is surrounded by a void-free silica outer cladding having an outer diameter of about 125 microns (all radial dimensions measured from the center of the optical fiber). The fiber attenuation at 850 nm and 1550 nm was 2.3 dB/Km and 0.47 dB/Km, respectively for the un-spun fiber and 2.5 and 0.48 dB/Km for the spun fiber. The 1 turn by 10 mm diameter mandrel wrap bend attenuation increase at 850 nm and 1550 nm was approximately 0.8 and 0.3 dB for the un-spun and spun fibers, respectively. Thus, the bend loss of 0.3 at 1550 nm was less than the product of two times $(1/\Delta 1MAX)^2$, or $2(1/1)=2$ dB. The fiber core had a 50 micron diameter of GeO2-SiO2 graded index (1% maximum $\Delta$) with a parabolic ($\alpha=2$) shape).

Optical properties for Examples 1-8 were measured. A portion of each fiber was measured for bend performance according to FOTP-62 (IEC-60793-1-47) by wrapping 1 turn around a either a 10 mm or 20 mm diameter mandrel (the "1×10 mm diameter macrobend loss" or the "1×20 mm diameter macrobend loss") and measuring the increase in attenuation due to the bending. Bandwidth was measured according to FOTP-204 with overfilled launch.

Figure 7:
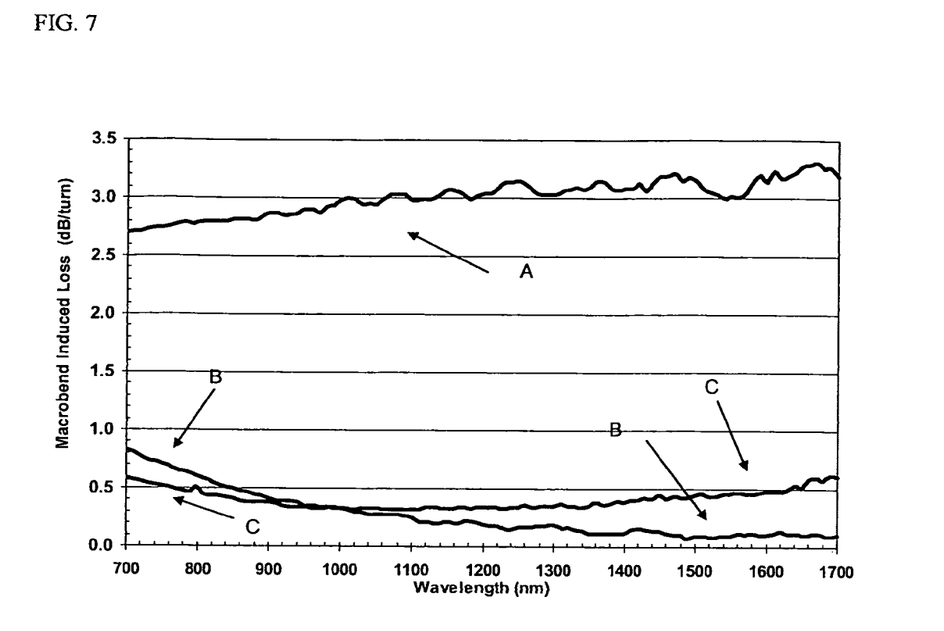
FIG. 7 shows the measured 1×10 mm macrobend attenuation increase at various wavelengths for Examples 1-3.

FIG. 7 shows the measured 1×10 mm macrobend attenuation increase at various wavelengths for Examples 1-3, each bend performance plot being labelled A, B, and C, respectively. While comparative Example 1 had macrobend induced loss of greater than 2.5 dB/turn at all wavelengths between 700 and 1700 nm, Examples 2 and 3 each had macrobend induced loss of less than 1.0 dB/turn at all wavelengths between 700 and 1700 nm, and less than 0.75 dB/turn at all wavelengths between 800 and 1700 nm. Example 3 had macrobend induced loss of less than 0.5 dB/turn at 850 nm.

Figure 8:
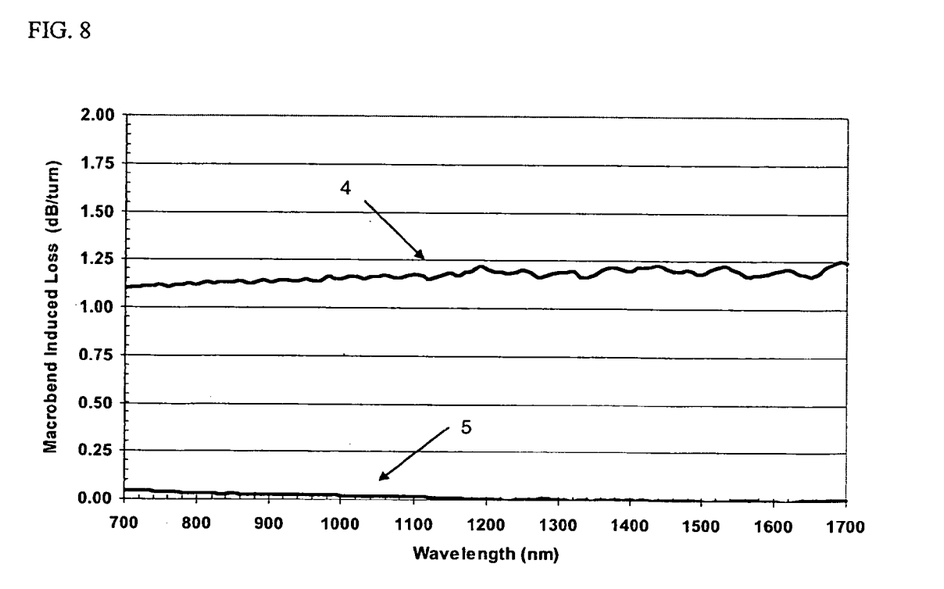
FIG. 8 shows the measured 1×10 mm macrobend attenuation increase at various wavelengths for Examples 4-5.

FIG. 8 shows the measured 1×10 mm macrobend attenuation increase at various wavelengths for Examples 4-5, each bend performance plot being labelled 4 and 5, respectively. While comparative Example 4 had macrobend induced loss of greater than 1.0 dB/turn at all wavelengths between 700 and 1700 nm, Example 5 had macrobend induced loss of less than 1.0 dB/turn at all wavelengths between 700 and 1700 nm, and even less than 0.5 dB/turn at all wavelengths between 700 and 1700 nm, and even less than 0.25 dB/turn at all wavelengths between 700 and 1700 nm, and even less than 0.10 dB/turn at all wavelengths between 700 and 1700 nm, and even less than 0.05 dB/turn at all wavelengths between 700 and 1700 nm. Example 5 had macrobend induced loss of less than 0.04 dB/turn at 850 nm.

Figure 9:
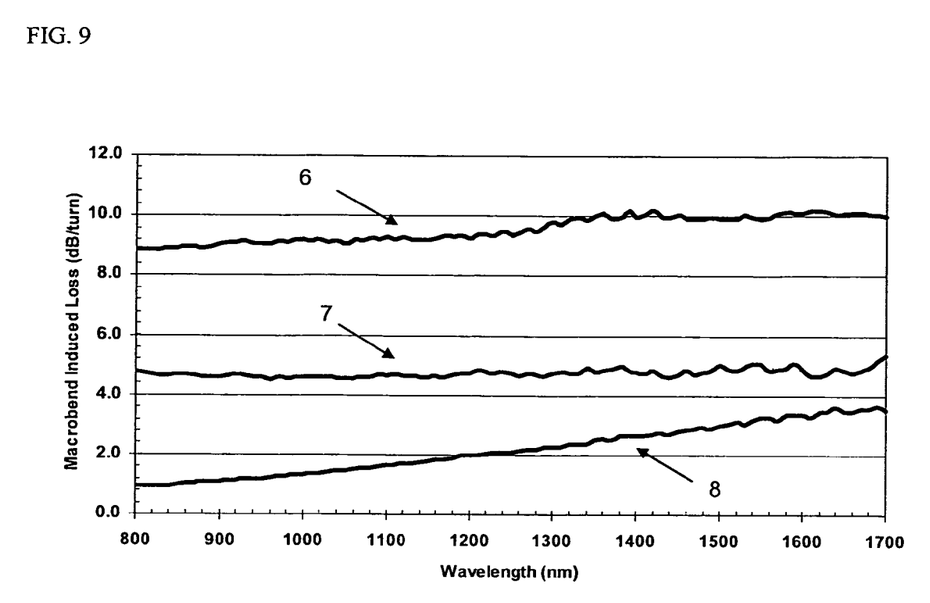
FIG. 9 shows the measured 1×10 mm macrobend attenuation increase at various wavelengths for Examples 6-8.

FIG. 9 shows the measured 1×10 mm macrobend attenuation increase at various wavelengths for Examples 6-8, each bend performance plot being labelled 6, 7, and 8, respectively. While comparative Example 6 had macrobend induced loss of greater than 8.5 dB/turn at all wavelengths between 800 and 1700 nm, Example 7 had macrobend induced loss of less than 6 dB/turn at all wavelengths between 800 and 1700 nm, and Example 8 had macrobend induced loss of less than 4 dB/turn at all wavelengths between 800 and 1700 nm. Example 7 had macrobend induced loss of less than 5 dB/turn at 850 nm. Example 8 had macrobend induced loss of less than 2 dB/turn at 850 nm. By contrast, comparative Example 1 (1.0% max $\Delta$, 50 µm core diameter) had macrobend induced loss of about 2.75 dB/turn at 850 nm, while Example 8 (0.5% max $\Delta$, 50 µm core diameter, depressed-index annular portion) had macrobend induced loss of less than 2 dB/turn at 850 nm. That is, Example 8 had a lower induced bend loss with up to a four-fold increase in bandwidth compared to Example 1.

As can be seen from FIGS. 7-9, the core and the cladding provide a 1 turn 10 mm diameter mandrel wrap attenuation increase at a wavelength of 1550 nm, in dB, due to bending, of less than or equal to the product of two times $(1/\Delta 1MAX)^2$. For example, in FIG. 7, $\Delta 1MAX$ was 1% and the product of two times $(1/\Delta 1MAX)^2$ is $2(1/1)^2=2$ (dB), and the 1 turn 10 mm diameter mandrel wrap attenuation increase at a wavelength of 1550 nm for Example 2 was measured to be less than 0.2 (i.e. about 0.1) dB, which is less than 2 dB, and for Example 3 was measured to be less than 0.5 (i.e. about 0.45) dB, which is also less than 2 dB. In FIG. 8, $\Delta 1MAX$ was 2% and the product of two times $(1/\Delta 1MAX)^2$ is $2(1/2)^2=0.5$ (dB), and the 1 turn 10 mm diameter mandrel wrap attenuation increase at a wavelength of 1550 nm for Example 5 was measured to be less than 0.1 dB, which is less than 0.5 dB. In FIG. 9, $\Delta 1MAX$ was 0.5% and the product of two times $(1/\Delta 1MAX)^2$ is $2(1/0.5)^2=8$ (dB), and the 1 turn 10 mm diameter mandrel wrap attenuation increase at a wavelength of 1550 nm for Example 7 was measured to be less than 6 (i.e. about 5.5) dB, which is less than 8 dB, and for Example 8 was measured to be less than 4 (i.e. about 3.5) dB, which is also less than 8 dB.

Thus, attenuation increases of less than 5 dB/turn, and in some embodiments less than 2 dB/turn, and in other embodiments less than 1 dB/turn, around a 10 mm diameter mandrel are achievable with the optical fiber disclosed herein having a maximum refractive index of less than or equal to 1% and a core diameter of greater than or equal to 50 µm.

In one set of embodiments, a multimode optical fiber is disclosed herein comprising a graded index glass core and a glass cladding surrounding and in contact with the core, the cladding comprising a depressed-index annular portion, wherein the core has a maximum relative refractive index $\Delta 1MAX$, in %, at 850 nm, and wherein the core and the cladding provide (a) a bandwidth of greater than 2.00 GHz-km at a wavelength of 850 nm, and (b) a 1 turn 10 mm diameter mandrel wrap attenuation increase at a wavelength of 1550 nm, in dB, due to bending, of less than or equal to the product of two times $(1/\Delta 1MAX)^2$. In some embodiments, $\Delta 1MAX$ is less than or equal to 1%.

In some embodiments, the depressed-index annular portion comprises a plurality of holes. In other embodiments, the depressed-index annular portion is hole-free.

In some embodiments, the fiber is spun.

In some embodiments, the depressed-index annular portion comprises a fluorine-doped glass. In some of these embodiments, the depressed-index annular portion is also hole-free; in other embodiments, the depressed-index annular portion comprises a plurality of holes.

In some embodiments, the depressed-index annular portion is spatially offset away from the core; in other embodiments, the depressed-index annular portion is in contact with the core.

In another set of embodiments, a multimode optical fiber is disclosed herein comprising a graded index glass core, extending from a centerline to a radius R1, and a cladding surrounding and in contact with the core, the cladding comprising an inner annular portion, and a depressed-index annular portion. The inner annular portion surrounds, and is preferably in contact with, the core. The depressed-index annular portion surrounds, and is preferably in contact with the inner annular portion. The core has a maximum relative refractive index $\Delta 1MAX$ at 850 nm, the inner annular portion has a maximum relative refractive index $\Delta 2MAX$ at 850 nm, and the depressed-index annular portion has a minimum relative refractive index $\Delta 3MIN$ at 850 nm, wherein $\Delta 1MAX>\Delta 1MAX>\Delta 3MIN$, and wherein the inner annular portion has a width W2>0.4 microns. In some embodiments, W2 >0.4 microns, more preferably between 0.4 and 20 microns, and most preferably between about 1 and 15 microns.

In some of these embodiments, the depressed-index annular portion comprises glass comprising a plurality of holes, or fluorine-doped glass, or fluorine-doped glass comprising a plurality of holes. In some embodiments, the holes are randomly or non-periodically disposed in the annular portion; in other embodiments, the holes are periodically disposed in the annular portion; in yet other embodiments, the cladding comprises both periodically and non-periodically disposed holes. In some embodiments, $\Delta 3MIN<-0.10\%$; in other embodiments, $\Delta 3MIN<-0.20\%$; in still other embodiments, $\Delta 3MIN<-0.30\%$; in yet other embodiments, $\Delta 3MIN<-0.40\%$. In some embodiments, the depressed-index annular portion has a profile volume with an absolute magnitude of greater than $10\%$-$\mu m^2$. In some embodiments, the inner annular portion has a width W2 greater than 5 microns and the depressed-index annular portion has a profile volume with an absolute magnitude of $>10\%$-$\mu m^2$. In some embodiments, the inner annular portion has a width W2>5 microns and the depressed-index annular portion has a profile volume with an absolute magnitude of greater than $50\%$-$\mu m^2$. In some embodiments, the depressed-index annular portion has a profile volume with an absolute magnitude of greater than $60\%$-$\mu m^2$. In some embodiments, the depressed-index annular portion extends to an outermost periphery of the cladding. In some embodiments, the cladding further comprises an outer annular portion with a maximum relative refractive index $\Delta 4MAX$, wherein $\Delta 1MAX>\Delta 4MAX>\Delta 3MIN$; in some of these embodiments, $\Delta 2MAX$ is substantially equal to $\Delta 4MAX$. In some embodiments, the core has a maximum relative refractive index, $\Delta 1MAX$, less than or equal to 0.80%. In some embodiments, R1>20 microns.

In another set of embodiments, multimode optical fiber is disclosed herein comprising a graded index glass core extending from a centerline to a radius R1 and a cladding surrounding and in contact with the core, the cladding comprising an inner annular portion, and a depressed-index annular portion, wherein the inner annular portion surrounds and is preferably in contact with the core, the depressed-index annular portion surrounds and is preferably in contact with the inner annular portion, the inner annular portion comprises hole-free glass, and the depressed-index annular portion comprises glass comprising with a plurality of holes. In some embodiments, the core has a maximum relative refractive index $\Delta 1MAX$, and the inner annular portion has a maximum relative refractive index $\Delta 2MAX$, and $\Delta 1MAX>\Delta 2MAX$. In some embodiments, the plurality of holes comprises a maximum hole diameter of 15 microns. In some embodiments, the holes are periodically disposed in the depressed-index annular portion; in other embodiments, the holes are non-periodically disposed in the depressed-index annular portion; in still other embodiments, the cladding comprises both periodically and non-periodically disposed holes. In some embodiments, at least 90% of the plurality of non-periodically disposed holes comprises a maximum average hole diameter of 10 microns. In some embodiments, the plurality of non-periodically disposed holes comprises an average hole diameter of less than 2000 nm. In some embodiments, the depressed-index annular portion comprises a regional void area percent greater than 0.5 percent. In some embodiments, the depressed-index annular portion comprises a regional void area percent of between 1 and 20 percent. In some embodiments, the depressed-index annular portion comprises a total void area percent greater than 0.05 percent. In some embodiments, the depressed-index annular portion extends to an outermost periphery of the cladding; in other embodiments, the cladding further comprises a hole-free glass outer annular portion, and in some of these embodiments, the outer annular portion extends to an outermost periphery of the cladding. In some embodiments, the core has a maximum relative refractive index, $\Delta 1MAX$, less than or equal to 0.80%. In some embodiments, R1>20 microns.

By "total fiber void area percent", we mean total cross-sectional area of the voids divided by total cross-sectional area of the optical fiber×100. By "regional void area percent", we mean the total area of the voids in a void containing region divided by the total area of the void containing region (when the optical fiber is viewed in cross-section taken perpendicular to the axis of the optical fiber) times 100, the void containing region being defined by the inner and outer boundaries of the void containing region. For example, if the inner edge of the innermost void in the fiber has a radial location of 4 microns from the axial centerline of the fiber, and the outer edge of the outer most void in the fiber has a radial location of 60 microns from the centerline, then the area of the void containing region is approximately 11309−50=11259 square microns. If the total cross sectional area of voids contained in this void containing region is 1100 square microns, then the void area percent of the void containing region is approximately 9.8 percent.

In another set of embodiments, multimode optical fiber is disclosed herein comprising a graded index glass core and a cladding surrounding and in contact with the core, the cladding comprising a depressed-index annular portion surrounding the core, wherein the depressed-index annular portion comprises glass comprising a plurality of holes. In some embodiments, the depressed-index annular portion is in contact with the core. In some embodiments, the cladding further comprises an outer annular portion surrounding the depressed-index annular portion; in some of these embodiments, the outer annular portion comprises hole-free glass. In some embodiments, the cladding further comprises an inner annular portion, which can be hole-free, surrounding the core; in some of these embodiments, the depressed-index annular portion surrounds the inner annular portion; and in some embodiments, the cladding further comprises an outer annular portion surrounding the depressed-index annular portion. In some embodiments, the holes are non-periodically disposed in the depressed-index annular portion; in some of these embodiments, the plurality of holes in the depressed-index annular portion comprises a maximum hole diameter of 15 microns; in other embodiments, at least 90% of the plurality of non-periodically disposed holes comprises a maximum average hole diameter of 10 microns; in other embodiments, the plurality of non-periodically disposed holes comprises an average hole diameter of less than 2000 nm; in other embodiments, the depressed-index annular portion comprises a regional void area percent greater than 0.5 percent; in other embodiments, the depressed-index annular portion comprises a regional void area percent of between 1 and 20 percent; in other embodiments, the depressed-index annular portion comprises a total void area percent greater than 0.05 percent. In some embodiments, the depressed-index annular portion extends to an outermost periphery of the cladding. In some embodiments, the cladding further comprises a hole-free glass outer annular portion; in some of these embodiments, the outer annular portion extends to an outermost periphery of the cladding. In some embodiments, the core has a maximum relative refractive index, $\Delta 1MAX$, less than or equal to 0.80%. In some embodiments, the graded index glass core extends from a centerline to a radius R1, wherein R1>20 microns.

In another set of embodiments, multimode optical fiber is disclosed herein comprising a graded index glass core extending from a centerline to a radius R1, and a cladding surrounding and in contact with the core, the cladding comprising a depressed-index annular portion and an outer annular portion, wherein the depressed-index annular portion surrounds and is in contact with the core and comprises glass comprising a plurality of holes, and wherein the outer annular portion surrounds and is in contact with the depressed-index annular portion. In some embodiments, the core has a maximum relative refractive index, Δ1MAX, less than or equal to 0.80%. In some embodiments, R1>20 microns. In some embodiments, the plurality of holes comprises a maximum hole diameter of 15 microns. In some embodiments, the holes are periodically disposed in the depressed-index annular portion. In some embodiments, the holes are non-periodically disposed in the depressed-index annular portion. In some embodiments, at least 90% of the plurality of non-periodically disposed holes comprises a maximum average hole diameter of 10 microns. In some embodiments, the plurality of non-periodically disposed holes comprises an average hole diameter of less than 2000 nm. In some embodiments, the depressed-index annular portion comprises a regional void area percent greater than 0.5 percent. In some embodiments, the depressed-index annular portion comprises a regional void area percent of between 1 and 20 percent. In some embodiments, the depressed-index annular portion comprises a total void area percent greater than 0.05 percent.

In another set of embodiments, multimode optical fiber is disclosed herein comprising a graded index glass core extending from a centerline to a radius R1, wherein R1>20 microns, and a cladding surrounding and in contact with the core, the cladding comprising a depressed-index annular portion and an outer annular portion, wherein the depressed-index annular portion surrounds and is in contact with the core, and the outer annular portion surrounds and is in contact with the depressed-index annular portion, wherein the core has a maximum relative refractive index at 850 nm, Δ1MAX, less than or equal to 0.80%, wherein the depressed-index annular portion surrounds and is in contact with the core and has a maximum relative refractive index, Δ2MIN, and wherein Δ1MAX>0>Δ2MIN. Preferably, the relative refractive index of the core is entirely positive. In some embodiments, the depressed-index annular portion has profile volume with an absolute magnitude of less than 200%-μm². In some embodiments, the depressed-index annular portion has a profile volume with an absolute magnitude of greater than 10 and less than 200%-μm². In some embodiments, the core has a substantially parabolic refractive index profile. In some embodiments, the core has a refractive index profile having an alpha (a) shape with an α of about 2 at a wavelength of 850 nm. In some embodiments, the cladding directly adjacent to the core does not have an alpha (α) shape with an α of 1.8 to 2.3 at a wavelength of 850 nm. In some embodiments, Δ1MAX is less than 0.70%. In some embodiments, the core and the cladding provide (a) a bandwidth of greater than 2.00 GHz-km at a wavelength of 850 nm, and (b) a 1 turn 10 mm diameter mandrel wrap attenuation increase at a wavelength of 1550 nm, in dB, due to bending, of less than or equal to the product of two times (1/Δ1MAX)². In some embodiments, R1>22 microns; in other embodiments, R1≦24 microns. In some embodiments, the depressed-index annular portion comprises glass comprising a plurality of holes, or fluorine-doped glass, or fluorine-doped glass comprising a plurality of holes. In some embodiments, the depressed-index annular portion has a refractive index profile comprising a minimum relative refractive index less than −0.10%; in other embodiments, less than −0.20%; in other embodiments, less than −0.30%; in other embodiments, less than −0.40%. In some embodiments, the depressed-index annular portion has a refractive index profile comprising a profile volume with an absolute magnitude of less than 200 μm²-%. In some embodiments, the depressed-index annular portion comprises glass comprising a plurality of holes; in some of these embodiments, the plurality of holes comprises a maximum hole diameter of 15 microns. In some embodiments, the holes are periodically disposed in the depressed-index annular portion. In some embodiments, the holes are non-periodically disposed in the depressed-index annular portion. In other embodiments, the depressed-index annular portion comprises both periodically and non-periodically disposed holes. For some embodiments having non-periodically disposed holes, at least 90% of the plurality of non-periodically disposed holes comprises a maximum average hole diameter of 10 microns. In some embodiments, the plurality of non-periodically disposed holes comprises an average hole diameter of less than 2000 nm. In some embodiments, the depressed-index annular portion comprises a regional void area percent greater than 0.5 percent. In some embodiments, the depressed-index annular portion comprises a regional void area percent of between 1 and 20 percent. In some embodiments, the depressed-index annular portion comprises a total void area percent greater than 0.05 percent.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. A multimode optical fiber comprising:
   a graded index multimode glass core having a radius greater than 20 microns and less than 28 microns and an alpha between 2.1 and 2.3; and
   a glass cladding surrounding and in contact with the core, the cladding comprising a depressed-index annular portion which is spaced from said core;
   wherein the fiber exhibits (a) a bandwidth of greater than 750 MHz-km at a wavelength of 850 nm, and (b) a 1 turn 10 mm diameter mandrel wrap attenuation increase at a wavelength of 1550 nm, in dB, of less than 1.5 dB.

2. The multimode optical fiber of claim 1 wherein the depressed-index annular portion comprises a profile volume with an absolute magnitude of greater than 100%-μm².

3. The multimode optical fiber of claim 2 wherein the cladding further comprises an outer cladding region having a higher index delta than said depressed region, and said core is parabolic in shape and ends where the core exhibits a refractive index delta which is substantially equal to that of the outer cladding region.

4. The multimode optical fiber of claim 2 wherein the depressed-index annular portion is offset from the core by at least 0.4 microns.

5. The multimode optical fiber of claim 2 wherein the depressed-index annular portion comprises a profile volume with an absolute magnitude of greater than 120%-μm².

6. The multimode optical fiber of claim 2 wherein the fiber is spun.

7. The multimode optical fiber of claim 2 wherein the restricted mode launch bandwidth is greater than 1 GHz-km at a wavelength of 850 nm.

8. The multimode optical fiber of claim 1 wherein said fiber exhibits a restricted mode launch bandwidth greater than 1.5 GHz-km at a wavelength of 850 nm.

9. The multimode optical fiber of claim 1 wherein said fiber exhibits a restricted mode launch bandwidth greater than 3 GHz-km at a wavelength of 850 nm.

10. The multimode fiber of claim 1, wherein said fiber comprises fluorine in the depressed-index annular portion.

11. The multimode optical fiber of claim 1 wherein said fiber exhibits a 1 turn 10 mm diameter mandrel wrap attenuation increase at a wavelength of 1550 nm, in dB, of less than 1.0 dB.

12. The multimode optical fiber of claim 2 wherein said fiber comprises fluorine in the depressed-index annular portion, and said core comprises a radius less than 27 microns.

13. A multimode optical fiber comprising:
a graded index multimode glass core having a radius greater than 20 microns and less than 28 microns; and
a glass cladding surrounding and in contact with the core, the cladding comprising a depressed-index annular portion which comprises a profile volume with an absolute magnitude of greater than 100%-$\mu m^2$, wherein the depressed-index annular region is offset from said core by at least 0.4 microns, and
wherein the fiber exhibits (a) a bandwidth of greater than 750 MHz-km at a wavelength of 850 nm, and (b) a 1 turn 10 mm diameter mandrel wrap attenuation increase at a wavelength of 1550 nm of less than 1.5 dB.

14. The multimode optical fiber of claim 13, wherein the fiber exhibits a 1 turn 10 mm diameter mandrel wrap attenuation increase at a wavelength of 1550 nm, in dB, of less than 1.0 dB.

15. The multimode optical fiber of claim 13, wherein said fiber comprises fluorine in the depressed-index annular portion, and said core comprises a radius less than 27 microns.

16. The multimode optical fiber of claim 13 wherein said fiber exhibits a restricted mode launch bandwidth greater than 3 GHz-km at a wavelength of 850 nm.

17. The multimode optical fiber of claim 4, wherein the core and the cladding provide a bandwidth of greater than 3.0 GHz-km at a wavelength of 850 nm.

18. The multimode optical fiber of claim 4, wherein the depressed-index annular portion has a profile volume with an absolute magnitude of less than 200%-$\mu m^2$.

19. The multimode optical fiber of claim 17, wherein the depressed-index annular portion has a profile volume with an absolute magnitude of less than 200%-$\mu m^2$.

20. The multimode optical fiber of claim 8, wherein the depressed-index annular portion has a profile volume with an absolute magnitude of greater than 85%-$\mu m^2$.

21. The multimode optical fiber of claim 1, wherein the depressed-index annular portion has a profile volume with an absolute magnitude of less than 200%-$\mu m^2$.

22. The multimode optical fiber of claim 13, wherein the core and the cladding provide a bandwidth of greater than 2.0 GHz-km at a wavelength of 850 nm.

23. The multimode optical fiber of claim 13, wherein the core and the cladding provide a bandwidth of greater than 3.0 GHz-km at a wavelength of 850 nm.

* * * * *